US012593333B2

(12) United States Patent
Zhang et al.

(10) Patent No.: US 12,593,333 B2
(45) Date of Patent: Mar. 31, 2026

(54) METHODS, SYSTEM, USER EQUIPMENT, AND APPARATUS FOR UPLINK RESOURCE MUTING OPERATION IN WIRELESS COMMUNICATION

(71) Applicant: APPLE INC., Cupertino, CA (US)

(72) Inventors: Dawei Zhang, Cupertino, CA (US); Wei Zeng, Cupertino, CA (US); Haitong Sun, Cupertino, CA (US); Yushu Zhang, Beijing (CN); Oghenekome Oteri, Cupertino, CA (US); Chunxuan Ye, Cupertino, CA (US); Weidong Yang, Cupertino, CA (US); Seyed Ali Akbar Fakoorian, Cupertino, CA (US); Sigen Ye, Cupertino, CA (US); Chunhai Yao, Beijing (CN); Hong He, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 514 days.

(21) Appl. No.: 17/787,820

(22) PCT Filed: Sep. 6, 2021

(86) PCT No.: PCT/CN2021/116666
§ 371 (c)(1),
(2) Date: Jun. 21, 2022

(87) PCT Pub. No.: WO2023/029035
PCT Pub. Date: Mar. 9, 2023

(65) Prior Publication Data
US 2023/0345467 A1     Oct. 26, 2023

(51) Int. Cl.
*H04W 72/1268*     (2023.01)
*H04W 72/23*     (2023.01)

(52) U.S. Cl.
CPC ....... *H04W 72/1268* (2013.01); *H04W 72/23* (2023.01)

(58) Field of Classification Search
CPC .............. H04W 72/1268; H04W 72/23; H04L 5/0016; H04L 5/0051; H04L 5/0044; H04L 5/0094
See application file for complete search history.

(56) References Cited

U.S. PATENT DOCUMENTS

| | | | |
|---|---|---|---|
| 9,642,126 B2 | 5/2017 | Park et al. | |
| 2011/0105144 A1 | 5/2011 | Siomina et al. | |
(Continued)

FOREIGN PATENT DOCUMENTS

| | | |
|---|---|---|
| CN | 106063178 | 10/2016 |
| CN | 110830193 | 2/2020 |
(Continued)

OTHER PUBLICATIONS

[Unknown Author], "3rd Generation Partnership Project; Technical Specification Group Radio Access Network; Evolved Universal Terrestrial Radio Access (E-UTRA); LTE Positioning Protocol (LPP) (Release 11)," 3GPP TS 36.355 V11.5.0, Dec. 2013, 118 pages.
(Continued)

*Primary Examiner* — Joseph E Avellino
*Assistant Examiner* — Adam Joel Cerlanek
(74) *Attorney, Agent, or Firm* — Fish & Richardson P.C.

(57) ABSTRACT

Systems, methods, and apparatuses for muting resource elements used for wireless communications is disclosed. In one aspect, a method can include actions of obtaining, by user equipment (UE), configuration data that indicates a frequency density of muted resource blocks, identifying, by the UE and based on a value of an antenna ports information element in downlink control information (DCI) that sched-
(Continued)

ules a PUSCH transmission, a group of resource elements within the muted resource blocks, determining, by the UE, a muted resource pattern (MRP) within the RBs for the scheduled PUSCH based on the frequency density of the muted resource blocks and the identified group of resource elements, and transmitting, by the UE, an allocation of RBs for PUSCH without transmission on the identified group of resource elements of the determined MRP.

20 Claims, 21 Drawing Sheets

(56) References Cited

U.S. PATENT DOCUMENTS

| | | | |
|---|---|---|---|
| 2011/0230144 A1 | 9/2011 | Siomina et al. | |
| 2012/0213109 A1 | 8/2012 | Xu et al. | |
| 2012/0257515 A1 | 10/2012 | Hugl et al. | |
| 2013/0010750 A1 | 1/2013 | Hoshino et al. | |
| 2013/0051317 A1 | 2/2013 | Ji et al. | |
| 2013/0079019 A1 | 3/2013 | Yu et al. | |
| 2013/0083780 A1 | 4/2013 | Luo et al. | |
| 2014/0038598 A1 | 2/2014 | Ren et al. | |
| 2014/0146689 A1 | 5/2014 | Gaur et al. | |
| 2014/0146719 A1* | 5/2014 | Gao | H04J 3/1694 |
| | | | 370/278 |
| 2015/0049649 A1 | 2/2015 | Zhu et al. | |
| 2015/0111505 A1 | 4/2015 | Kim et al. | |
| 2015/0312927 A1* | 10/2015 | Ko | H04L 5/0094 |
| | | | 370/336 |
| 2020/0244400 A1* | 7/2020 | Kim | H04W 72/23 |
| 2021/0105785 A1* | 4/2021 | Manolakos | H04L 5/0026 |
| 2022/0078815 A1* | 3/2022 | Manolakos | H04W 72/535 |
| 2023/0099813 A1* | 3/2023 | Parron | H04L 27/0006 |
| | | | 370/330 |

FOREIGN PATENT DOCUMENTS

| | | | | |
|---|---|---|---|---|
| RU | 2012113552 | 10/2013 | | |
| WO | WO 2011136711 | 11/2011 | | |
| WO | WO 2013180460 | 12/2013 | | |
| WO | WO 2014008665 | 1/2014 | | |
| WO | WO 2015023224 | 2/2015 | | |
| WO | WO 2017107212 | 6/2017 | | |
| WO | WO-2017107212 A1 * | 6/2017 | | H04B 7/0689 |
| WO | WO-2018175553 A1 * | 9/2018 | | H04W 72/23 |

OTHER PUBLICATIONS

[Unknown Author], "3rd Generation Partnership Project; Technical Specification Group Radio Access Network; Evolved Universal Terrestrial Radio Access (E-UTRA); Physical channels and modulation (Release 11)," 3GPP TS 36.211 V11.5.0, Dec. 2013, 120 pages.
[Unknown Author], "3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.1.0, Mar. 2014, 356 pages.
[Unknown Author], 3rd Generation Partnership Project; Technical Specification Group Radio Access Network; NR; Multiplexing and channel coding (Release 15) 3GPP TS 38.212 V15.11.0, Jun. 2021, 101 pages.

[Unknown Author], "3rd Generation Partnership Project; Technical Specification Group Radio Access Network; NR; Physical channels and modulation (Release 15)," 3GPP TS 38.211 V15.9.0, Jun. 2021, 97 pages.
[Unknown Author], "3rd Generation Partnership Project; Technical Specification Group Radio Access Network; NR; Physical layer procedures for control (Release 15)," 3GPP TS 38.213 V15.14.0, Jun. 2021, 110 pages.
[Unknown Author], "3rd Generation Partnership Project; Technical Specification Group Radio Access Network; NR; Radio Resource Control (RRC) protocol specification (Release 16)," 3GPP TS 38.331 V16.5.0, Jun. 2021, 959 pages.
[Unknown Author], "3rd Generation Partnership Project; Technical Specification Group Radio Access Network; Small cell enhancements for E-UTRA and E-UTRAN—Physical layer aspects (Release 12)," 3GPP TR 36.872 V12.1.0, Dec. 2013, 100 pages.
[Unknown Author], "3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.6.0, Jun. 2021, 88 pages.
ETRI, "Discovery signal design for small sell on/off," 3GPP TSG RAN WG1 Meeting #76, R1-140213, Prague, Czech Republic, Feb. 10-14, 2014, 4 pages.
Extended European Search Report issued in European Appln. No. 15765556.4, dated Oct. 6, 2017, 11 pages.
Huawei, Hisilicon, "Scenario analysis for positioning in Het-Net scenarios," 3GPP TSG-RAN WG4 Meeting #68bis, R4-135165, Riga, Latvia, Oct. 7-11, 2013, 2 pages.
Intel Corporation, "Discussion on the OTDOA enhancement in HetNet scenarios," 3GPP TSG-RAN WG4 Meeting #69, R4-136197, San Francisco, USA, Nov. 11-15, 2013, 3 pages.
Intel Corporation, "Further study on the positioning enhancement in HetNet scenario," 3GPP TSG-RAN WG4 Meeting #70 Bis, R4-141586, San Jose del Cabo, Mexico, Mar. 31-Apr. 4, 2014, 4 pages.
Intel Corporation, "Further study on the positioning enhancement in HetNet scenario," 3GPP TSG RAN WG4 Meeting #72bis, R4-146535, Agenda Item: 9-4.4, Oct. 6-10, 2014, Singapore, 3 pages.
Intel Corporation, "Further study on the positioning enhancement in HetNet scenario," 3GPP TSG RAN WG4 Meeting #73, R4-147711, San Francisco, USA, Nov. 17-21, 2014, 2 pages.
Mediatek Inc., "Performance comparison of small cell discovery signal designs," 3GPP TSG-RAN WG1 #76, R1-140246, Prague, Czech Republic, Feb. 10-14, 2014, 7 pages.
Motorola Mobility, "Small cell discovery," 3GPP TSG RAN WG1 #72bis, R1-131519, Chicago, USA, Apr. 15-19, 2013, 2 pages.
NTT DOCOMO, "Small Cell Discovery for Efficient Small Cell On/Off Operation," 3GPP TSG RAN WG1 Meeting #74, R1-133457, Barcelona, Spain, Aug. 19-23, 2013, 8 pages.
Pantech & Curitel, "Muting for L TE Rel-9 OTDOA Positioning, " 3GPP TSG RAN WG1 Meeting #58-bis, R1-094336, Miyazaki, Japan, Oct. 12-16, 2009, 8 pages.
PCT International Search Report and Written Opinion in International Appln. No. PCT/US2015/014368, mailed Apr. 27, 2015, 12 pages.
PCT International Search Report and Written Opinion in International Appln. No. PCT/CN2021/116666, dated Mar. 28, 2022, 8 pages.
Qualcomm Incorporated, "Coexistence of LTE-MTC with NR," 3GPP TSG-RAN WG1 #95, R1-1813041, Spokane, USA, Nov. 12-16, 2019, 6 pages.
Samsung, "Discussion on the detection timing of small cell discovery signal," 3GPP TSG RAN WG1 #76, R1-140371, Prague, Czech Republic, Feb. 10-14, 2014, 4 pages.
ZTE, "Enhanced small cell on/off mechanisms," 3GPP TSG RAN WG1 Meeting #76, R1-140285, Prague, Czech Republic, Feb. 10-14, 2014, 5 pages.

* cited by examiner

Figure 7A    Type 1 DMRS    Figure 7B
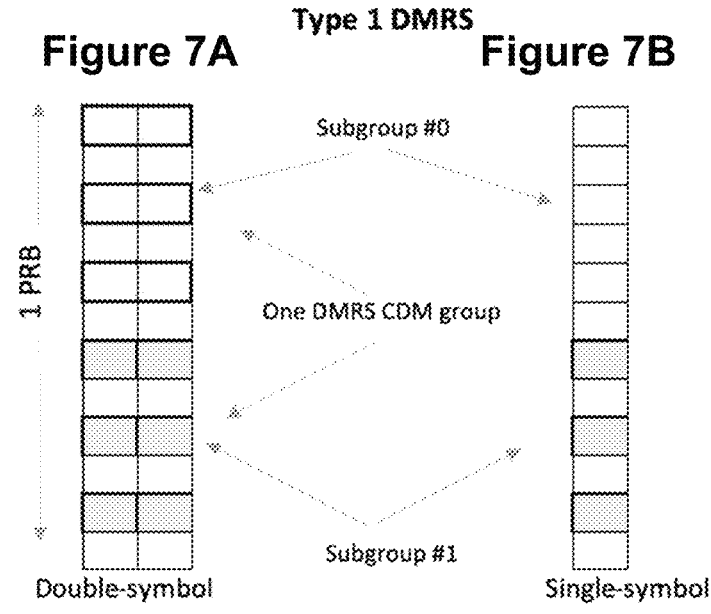
Type 2 DMRS
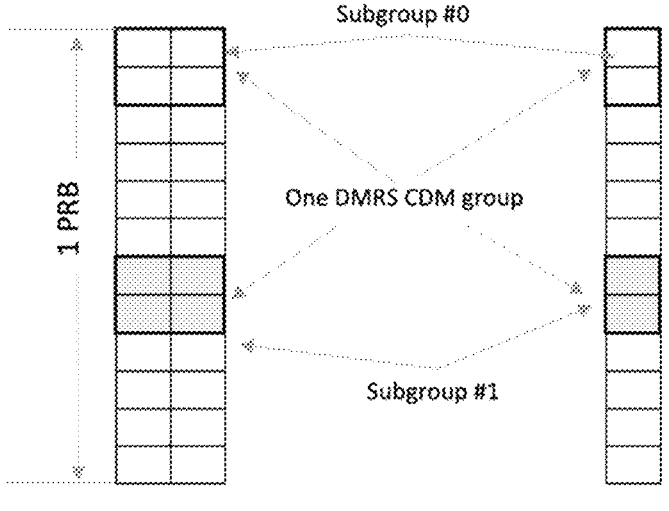
Figure 10A      Figure 10B
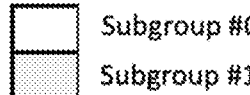

Figure 8A      Figure 8B      Figure 8C
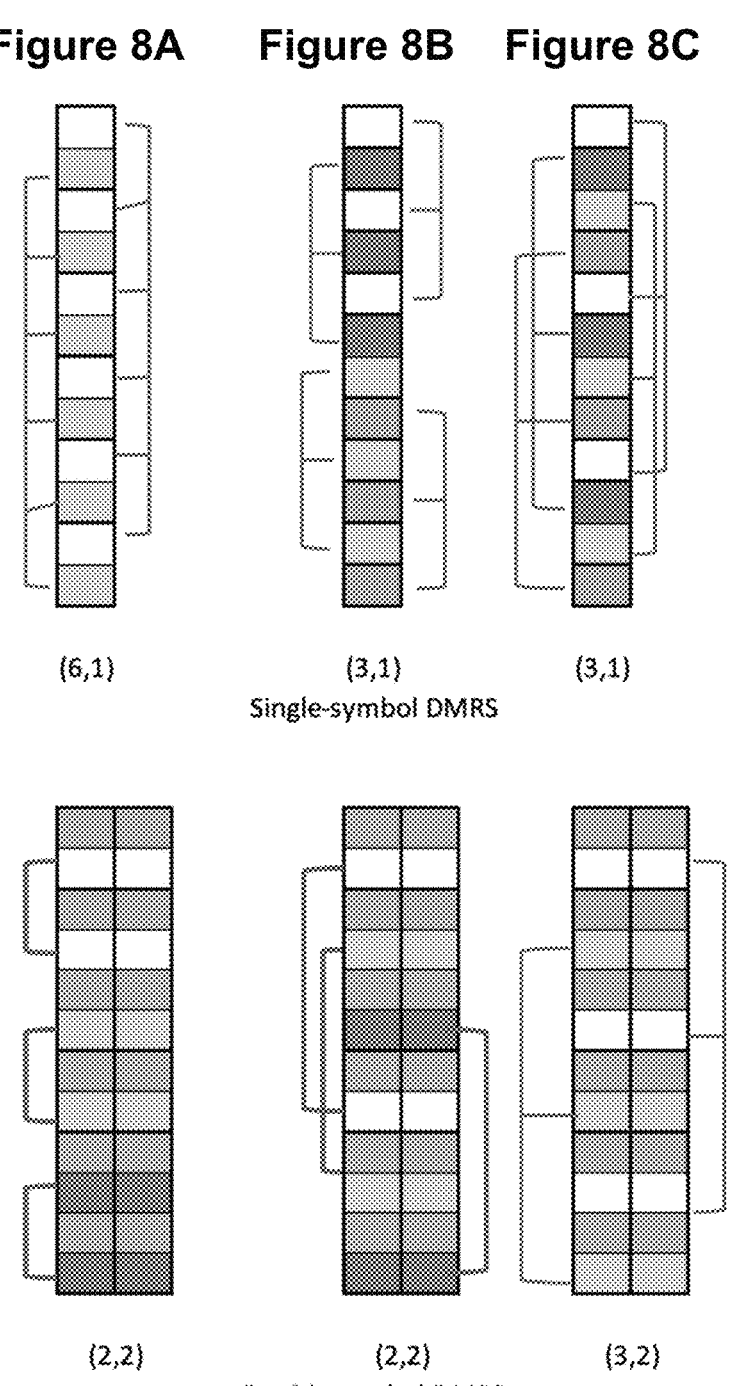
(6,1)                    (3,1)                    (3,1)
Single-symbol DMRS
(2,2)                    (2,2)                    (3,2)
Double-symbol DMRS
Figure 9A      Figure 9B      Figure 9C

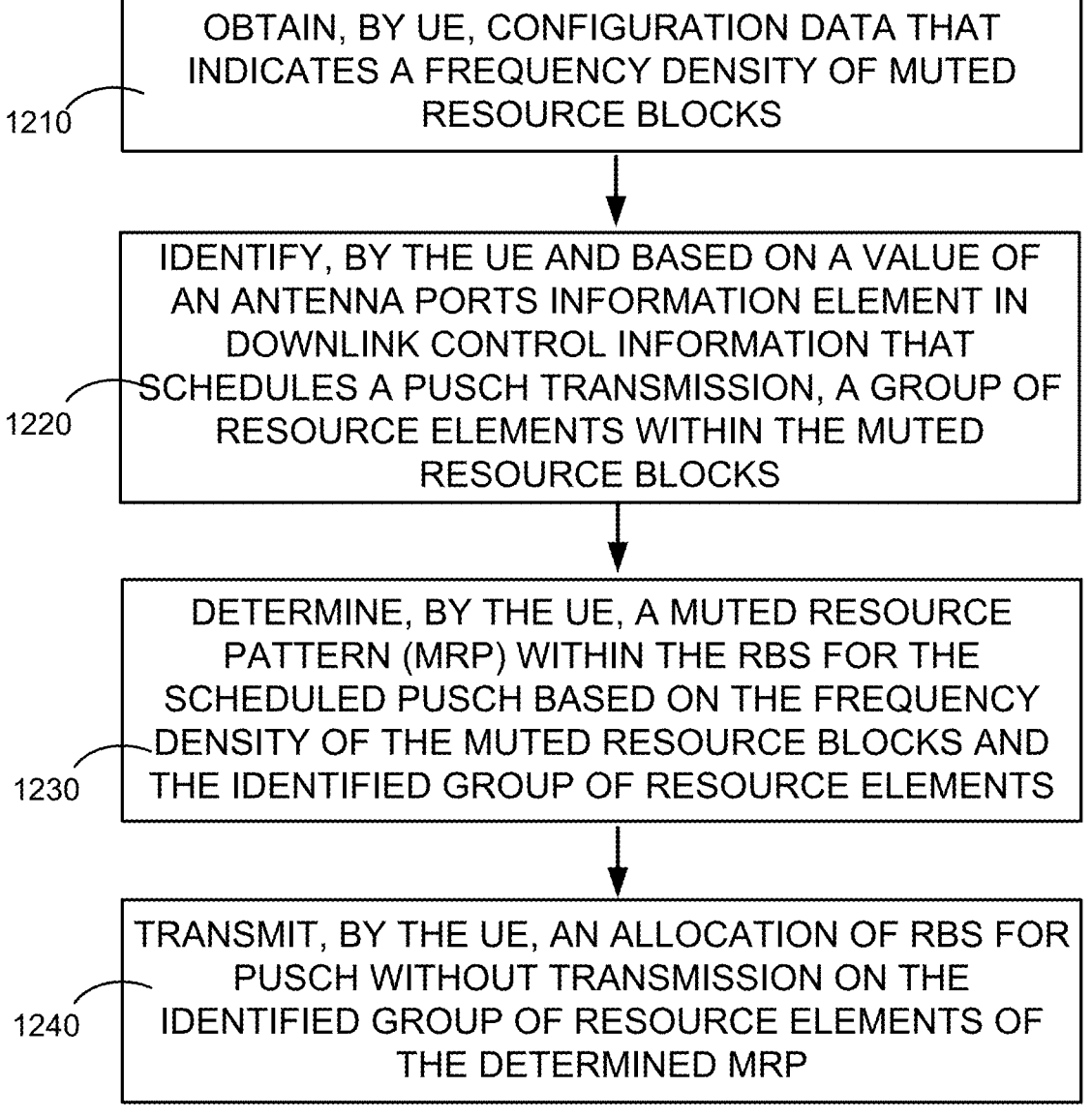

1210 — OBTAIN, BY UE, CONFIGURATION DATA THAT INDICATES A FREQUENCY DENSITY OF MUTED RESOURCE BLOCKS

1220 — IDENTIFY, BY THE UE AND BASED ON A VALUE OF AN ANTENNA PORTS INFORMATION ELEMENT IN DOWNLINK CONTROL INFORMATION THAT SCHEDULES A PUSCH TRANSMISSION, A GROUP OF RESOURCE ELEMENTS WITHIN THE MUTED RESOURCE BLOCKS

1230 — DETERMINE, BY THE UE, A MUTED RESOURCE PATTERN (MRP) WITHIN THE RBS FOR THE SCHEDULED PUSCH BASED ON THE FREQUENCY DENSITY OF THE MUTED RESOURCE BLOCKS AND THE IDENTIFIED GROUP OF RESOURCE ELEMENTS

1240 — TRANSMIT, BY THE UE, AN ALLOCATION OF RBS FOR PUSCH WITHOUT TRANSMISSION ON THE IDENTIFIED GROUP OF RESOURCE ELEMENTS OF THE DETERMINED MRP

Figure 12

METHODS, SYSTEM, USER EQUIPMENT, AND APPARATUS FOR UPLINK RESOURCE MUTING OPERATION IN WIRELESS COMMUNICATION

CLAIM OF PRIORITY

This application claims priority under 35 U.S.C. 371 to International Application No. PCT/CN2021/116666, filed on Sep. 6, 2021, the entire contents of which are hereby incorporated by reference.

BACKGROUND

Cross-link interference can occur when the uplink of one cell causes interference to the downlink of another cell. Such interference can reduce can lead to loss of data or poor quality of service, among other things.

SUMMARY

According to one innovative aspect of the present disclosure, a method for muting resource elements used for wireless communications is disclosed. In one aspect, the method can include actions of obtaining, by user equipment (UE), configuration data that indicates a frequency density of muted resource blocks, identifying, by the UE and based on a value of an antenna ports information element in downlink control information (DCI) that schedules a PUSCH transmission, a group of resource elements within the muted resource blocks, determining, by the UE, a muted resource pattern (MRP) within the RBs for the scheduled PUSCH based on the frequency density of the muted resource blocks and the identified group of resource elements, and transmitting, by the UE, an allocation of RBs for PUSCH without transmission on the identified group of resource elements of the determined MRP.

Other versions include corresponding systems, apparatus, and computer programs to perform the actions of methods defined by instructions encoded on computer readable storage devices.

These and other versions may optionally include one or more of the following features. For instance, in some implementations, the frequency density of muted resource blocks has been provided using high layer signaling.

In some implementations, the high layer signaling can include SIB1 or RRC signaling.

In some implementations, identifying, by the UE and based on a value of an antenna ports information element in the downlink control information (DCI) that schedules a PUSCH transmission, a group of resource elements within the muted resource blocks can include determining, by the UE and based on the value of the antenna ports information element in the DCI that schedules a PUSCH transmission, that at least one DMRS CDM group is not included in a 'Number of DMRS CDM group(s) without data' field, and based on a determination, by the UE, that at least one DMRS CDM Group is not included in a 'Number of DMRS CMD group(s) without data' field, selecting an MRP pattern to include a group of resource elements of a DMRS CDM group with the lowest index among the DMRS CDM groups that is not included in 'Number of DMRS CDM group(s) without data'.

In some implementations, the selected DMRS CDM groups can include Cat-1 DMRS CDM group or the Cat-2 DRMS CDM group.

In some implementations, identifying, by the UE and based on a value of an antenna ports information element in the downlink control information (DCI) that schedules a PUSCH transmission, a group of resource elements within the muted resource blocks can include determining, by the UE and based on the value of the antenna ports information element, that each of a plurality of DMRS CDM groups are included in a 'Number of DMRS CDM group(s) without data' field, and based on a determination, by the UE, that each of a plurality of DMRS CDM groups are included in a 'Number of DMRS CDM group(s) without data' field, generating a predetermined muted resource pattern (MRP) that includes muted resource elements that do not overlap with resource elements of Cat-1 DMRS CDM group or Cat-2 DMRS CDM group.

In some implementations, the predetermined muted resource pattern (MRP) is hard-encoded in specification or generated based on parameters that is configured by RRC signaling.

In some implementations, the parameters configured by RRC signaling for the MRP determination can include a set of MRP patterns is first hard-encoded in specification in terms of REs in frequency domain and time domain and each MRP pattern is associated with a unique pattern index, and a pattern index value is given by higher layers to select one of the hard-encoded MRP patterns for a given PUSCH transmission.

In some implementations, the parameters configured by RRC signaling for the MRP determination include at least a first parameter that indicates number of resource elements (RE) in the frequency domain, a second parameter that indicates number of REs in the time domain, and a third parameter that indicates a starting symbol of the MRP.

In some implementations, the indicated number of REs can be consecutive or non-consecutive.

BRIEF DESCRIPTION OF DRAWINGS

FIG. 7A is a diagram of a visualization of a double symbol Type 1 DMRS-Group-Based MRP design.

FIG. 7B is a diagram of a visualization of a single symbol Type 1 DMRS-Group-Based MRP design.

FIG. 8A is a diagram of a visualization of a single symbol Type 1 DMRS-Group-Based MRP design having a pattern of (6,1).

FIG. 8B is a diagram of a visualization of a single symbol Type 1 DMRS-Group-Based MRP design having a pattern of (3,1).

FIG. 8C is a diagram of a visualization of another single symbol Type 1 DMRS-Group-Based MRP design having a pattern of (3,1).

FIG. 9A is a diagram of a visualization of a double symbol Type 1 DMRS-Group-Based MRP design having a pattern of (2,2).

FIG. 9B is a diagram of a visualization of another double symbol Type 1 DMRS-Group-Based MRP design having a pattern of (2,2).

FIG. 9C is a diagram of a visualization of a double-symbol Type 1 DMRS-Group-Based MRP design having a pattern of (3,2).

FIG. 10A is a diagram of a visualization of a double-symbol Type 2 DMRS-Group Based MRP design.

FIG. 10B is a diagram of a visualization of a double-symbol Type 2 DMRS-Group Based MRP design.

FIG. 12 is flowchart of an example of a process 1200 for muting resource elements used for wireless communications.

These and other aspects of the present disclosure will be described in more detail below and in the accompanying claims.

DETAILED DESCRIPTION

The present disclosure relates to methods, systems, and computer programs for reducing cross-link interference. Cross-link interference can occur when the uplink of one cell causes interference to the downlink of another cell. Conventional methods to address this problem can include, for example, configuring network devices so that all cells transmit downlink information at the start of a slot while all cells transmit downlink information at the end of the slot. The present disclosure differs from these conventional methods by enabling network devices such user equipment and base stations (e.g., gNodeb) to dynamically configure resource elements to mute particular resource elements of particular resource blocks. In essence, the present disclose enables UE to mute certain resource elements transmitted in a particular direction (e.g., uplink) that would otherwise interfere with resource elements transmitted in the opposite direction (e.g., downlink). This dynamic muting of resource elements can function to reduce cross-link interference so the muted resource element transmitted in a first direction no longer interferes with the corresponding resource elements in the second, opposite direction. This dynamic muting of resource elements can be achieved by UE, base stations, or both.

Figure 1:
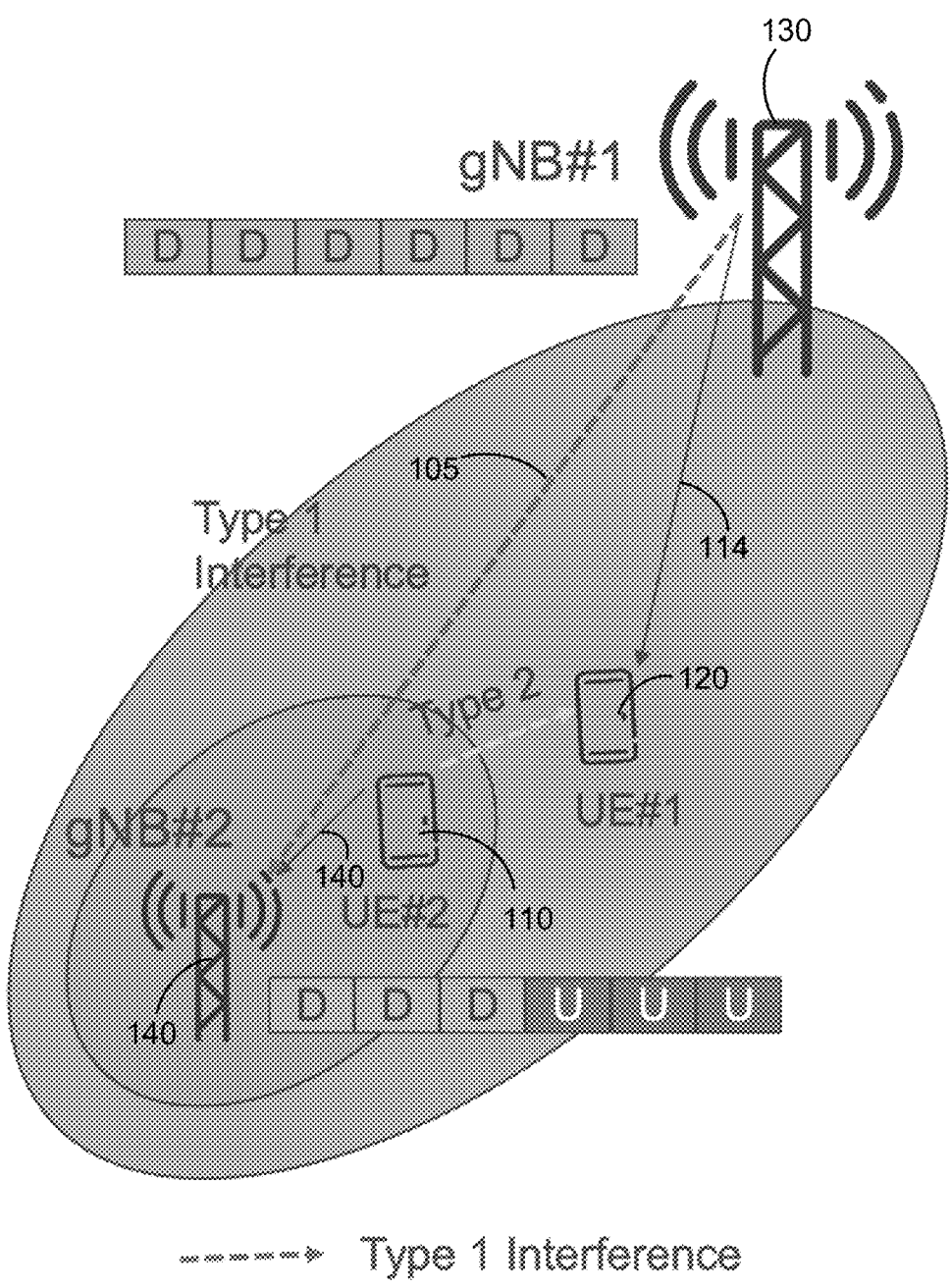
FIG. 1 is a contextual diagram that depicts examples of scenarios that can give rise to cross-link interference problems.

FIG. 1 is a contextual diagram that depicts examples of scenarios that can give rise to cross-link interference problems in more detail. By way of example, a first type of cross-link interference can occur when gNB 140 has a macro uplink 105 from another gNB 130 that interference with a pico uplink 107 from UE 110 that is within the cell of gNB 140. Here, the communications of the gNB 130 to the other gNB 140 interferes with the communications of the UE 110 with the gNB 140. Such interference can lead to loss of data or poor quality of service, among other things. This interference can be eliminated using the techniques of the present disclosure. By way of another example, a second type of cross-link interference can occur when UE 110 uplink communication 112 interferes with UE 120 downlink communication 114. Here, the communications of the UE 110 with the UE 120 interferes with the communications of the UE 120 and gNB 130. Like the prior example, such interference can lead to loss of data or poor quality of service, among other things. This interference can be eliminated using the techniques of the present disclosure.

The present disclosure provides a number of different methods for dynamically muting resource elements of particular resource blocks in order to mitigate the occurrence of cross-link interference. In some implementations, this can include use a look-up table to determine one or more predefined DMRS CDM groups of resource elements that are to be muted based on properties of a communication device such as a number of antenna ports used. However, in other implementations, the present disclosure can define and select newly determined groups of resource elements.

In some implementations, the process can include determining which resource blocks are to include muted resources elements. A resource block can be defined in terms of frequency domains, time domains, or both. In some 4G networks, for example, resource blocks may be fined in terms of both frequency and time domains. However, in some 5G networks, for example, resource blocks may be defined only in terms of the frequency domain. In such 5G implementations, resource allocation must specify both a number of resource blocks and a number of symbols that define, or otherwise describe, the time domain. A particular resource element of a resource block can correspond to a subcarrier of the frequency domain and a symbol in the time domain. For purposes of the present disclosure, a muted resource element is a set of one or more resource elements (REs) in a subset of resource blocks (RBs) within the RBs allocation for physical uplink shared channel (PUSCH) transmission that have been determined, by UE, as not available for PUSCH. For purposes of this specification, an RB that includes one or more muted REs will be referred to herein as a muted RB.

Figure 2:
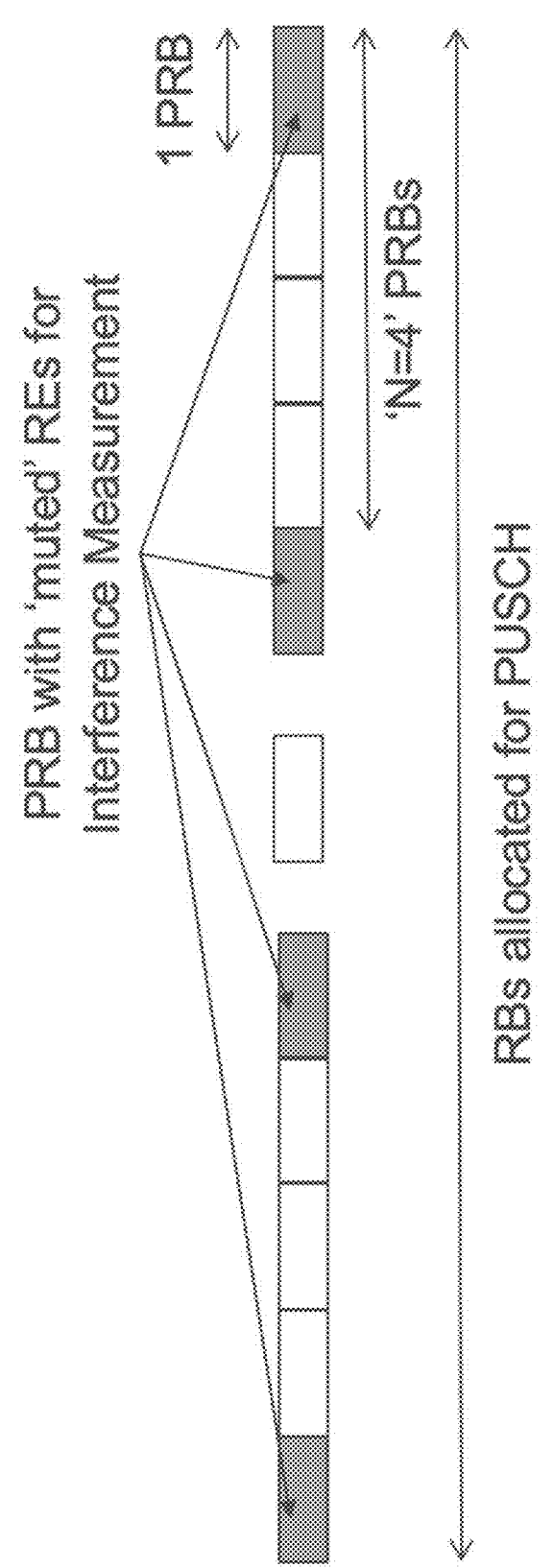
FIG. 2 is a diagram that represents a visualization of an example of non-contiguous muted resource blocks.

A device such as UE or a gNB can determine which RBs are to be muted RBs in different ways. In some implementations, for example, an RB allocated for PUSCH (e.g., a PRB) may be determined in a manner that minimizes the spectrum efficiency loss caused by muted REs. This can be achieved, for example, by repeating a muted RB (e.g., a PRB) with a frequency density of every "N" RBs as shown in FIG. 2. In this example of FIG. 2, a UE has explicitly defined that a muted RB is to occur every N RBs, with N in the example of FIG. 2 being set to 4. In some implementations, the frequency density can be explicitly configured by higher-layers such as, e.g., system information block 1 (SIB1) or UE-dedicated radio resource control (RRC) signaling. However, in other implementations, the default frequency density value may be hard-encoded in specification to minimize RRC signaling overhead and is applied if the frequency density field is not set, e.g., by higher level signaling.

In some implementations, frequency density of muted RBs can be determined using other methods. For example, an RB bundling procedure can be operated in downlink for physical downlink shared channel (PDSCH) transmission. In such implementations, precoding granularity is $P_{DL}$ consecutive RBs in the frequency domain. Different precodes of PDSCH can cause varied interferences. Correspondingly, one frequency density may be fixed to be minimum of $P_{DL}$ candidate values. Since $P_{DL}=(2,4,$ wideband), the frequency density of muted RBs ma be fixed to be '2,' i.e., one every 2 muted RBs.

Figures 3A, 3B, 3C:
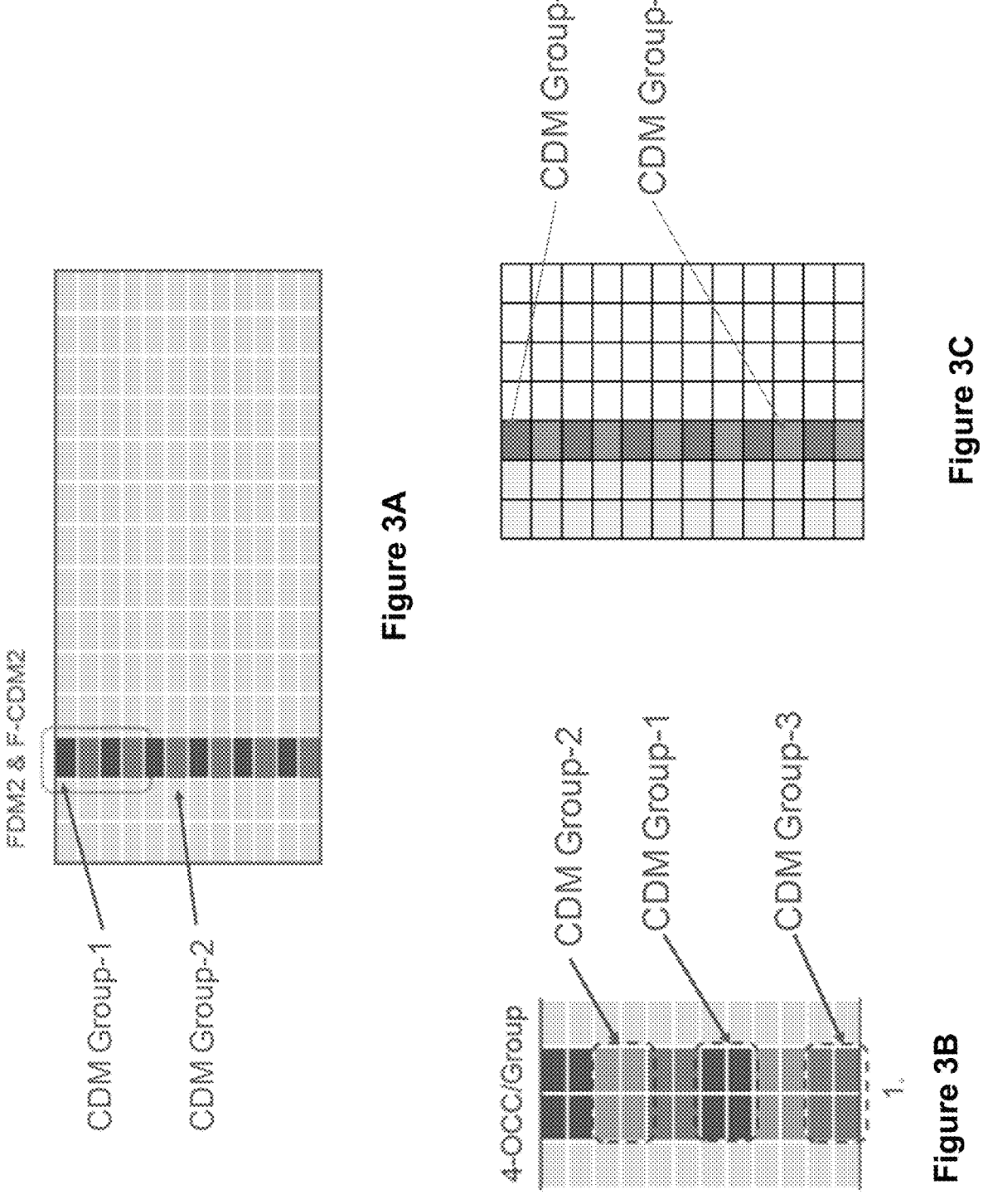
FIG. 3A is a diagram of a visualization of an example of a Type-1 DMRS Pattern when a transform pre-coder is disabled.
FIG. 3B is a diagram of a visualization of an example of a Type-2 DMRS Pattern when a transform pre-coder is disabled.
FIG. 3C is a diagram of a visualization of an example of a DMRS Pattern when a transform precoder is enabled.

A device such as a UE or gNB of the present disclosure can determine a set of one or more muted REs in a muted RB in multiple different ways. In some implementations, a set of muted REs, which may be referred to as a muted RE pattern, can be based on demodulation reference signal (DMRS) code division multiplexing (CDM) groups. As defined by Rel-15/16, there are two CDM groups supported for Type-1 DMRS pattern and three CDM groups supported for Type-2 DRMS pattern. An example of the DMRS CDM groups that can be employed are shown in FIGS. 3A-3B.

In such implementations, the three categories of DMRS CDM groups may be defined c Type-1/Type-2 DMRS patterns as follows:

"Cat-1 CDM group is a CDM group that is indicated without data by the 'Antenna Ports' field in scheduling downlink control information (DCI) 1_1 or 1_2; and"

Cat-2 CDM group is defined as an existing CDM group that is NOT Type-1 CDM group. In some implementations, a UE shall perform PUSCH RE rate-matching operation with the assumption that all of REs in Cat-1 DMRS CDM group(s) are NOT available.

However, the present disclosure is not limited to determining muted RE patterns using DMRS CDM groups. Instead, in some implementations, the present disclosure may use a novel Muted-RE-Pattern (MRP). A novel MRP may include any pattern of muted REs that do not overlap with the REs of the Cat-1 CDM group or the Cat-2 CDM group described above.

In some implementations, a UE may be explicitly indicate which of Cat-2 DMRS group or MRP is used for rate-matching of PUSCH. However, the present disclosure is not so limited. Instead, in some implementations, an implicit rule can be defined and used by the UE to determine a set of muted. For example, in some implementations, a UE can use an implicit rule that prioritizes Cat-2 DMRS CDM group over MRP for purpose of interference measurement. However, in some implementations, a UE may not expect that MRP is used for rate-matching operation of PUSCH transmission if Cat-2 CDM group is available to create muted RE based on the "antenna ports" value in scheduling DCI. If multiple Cat-2 CDM groups are available to establish a set of muted REs, the CDM group with lowest index can be used to create muted REs.

Table 1 and Table 2 can be used for implementations where the predefined DMRS CDM resource element groups shown in FIGS. 3A-3C are to be used as a muted RE element pattern. The "value" column in Table 1 and 2 functions as an index for the respective table and corresponds to the value of the "antenna ports" DCI information element. Thus, Table 1 or Table 2 can be used to determine muted RE element patterns based on legacy DMRS CDM group categorization into Cat-1 and Cat-2 CDM group based on the proposed rules.

For Table 1, shown below, Transform precoder is disabled and DMRS-Type=1, maxLength=1, tank-1:

TABLE 1

| Value | Number of DMRS CDM group(s) without data | DMRS Port(s) | Cat-1 CDM group(s) | Cat-2 CDM group(s) |
|---|---|---|---|---|
| 0 | 1 | 0 | 0 | 1 |
| 1 | 1 | 1 | 0 | 1 |
| 2 | 2 | 0 | 0, 1 | None |
| 3 | 2 | 1 | 0, 1 | None |
| 4 | 2 | 2 | 0, 1 | None |
| 5 | 2 | 3 | 0, 1 | None |
| 6-7 | Reserved | Reserved | Reserved | Reserved |

For Table 2, shown below, transform precoder is disabled and DMRS-Type=2, maxLength=1, rank1:

TABLE 2

| Value | Number of DMRS CDM group(s) without data | DMRS Port(s) | Cat-1 CDM group(s) | Cat-2 CDM group(s) |
|---|---|---|---|---|
| 0 | 1 | 0 | 0 | 1, 2 |
| 1 | 1 | 1 | 0 | 1, 2 |
| 2 | 2 | 0 | 0, 1 | 2 |
| 3 | 2 | 1 | 0, 1 | 2 |
| 4 | 2 | 2 | 0, 1 | 2 |
| 5 | 2 | 3 | 0, 1 | 2 |
| 6 | 3 | 0 | 0, 1, 2 | None |
| 7 | 3 | 1 | 0, 1, 2 | None |
| 8 | 3 | 2 | 0, 1, 2 | None |
| 9 | 3 | 3 | 0, 1, 2 | None |
| 10 | 3 | 4 | 0, 1, 2 | None |
| 11 | 3 | 5 | 0, 1, 2 | None |
| 12-15 | Reserved | Reserved | Reserved | Reserved |

The number of CDM groups without data of values 1, 2, and 3 in Tables 1 and 2 refers to CDM groups {0}, {0,1}, and {0, 1,2} respectively.

With reference to Table 1, when the value of the 'antenna ports' IE is 'O' or '1' in the scheduling DCI information element, CDM group #1 is Cat-2 CDM group, which can be used to create the muted REs. Accordingly, a rules based approach can be employed in order to determine the legacy DMRS CDM group to be used to establish a muted RE pattern. For example, if the value of the 'antenna ports' DCI information element is greater than 2, then there is no Cat-2 CDM group that can be used to establish a set of muted REs. In such implementations, a different MRP needs to be defined and used to generate the muted REs. Alternatively, if the 'antenna ports' DCI information element is less than 2, then either CDM group #1 or CDM-group #2 is used to establish a set of muted REs based on Table 1.

A similar rules based approach may be followed when using Table 2. With reference to Table 2, if the value of the 'antenna ports' DCI information element is greater than 6, then there is no Cat-2 CDM group that can be used to establish a set of muted REs. In such implementations, a different MRP needs to be defined and used to generate the muted REs. Alternatively, if the 'antenna ports' DCI information element is less than 6, then either CDM group #1 or CDM-group #2 is used to establish a set of muted REs based on Table 2.

A new MRP can be determined in a number of different ways. To facilitate PUSCH rate-matching, an MRP location is defined in two dimensions, i.e. time-domain and frequency-domain. One MRP can include $N_{RE}=N_{SC}{\times}N_{symb}$ REs, where $N_{SC}$ is the subcarriers in frequency-domain and $N_{symb}$ are the symbols in the time-domain.

The paired value of $<N_{SC}, N_{symb}>$ can be established in a number of different ways. In some implementations, for example, the value pair $<N_{SC}, N_{symb}>$ can be explicitly configured by dedicated RRC signaling, for example, based on UE-specific such as mobility speed. In other other implementations, the value of pair $<N_{SC}, N_{symb}>$ can be hard-encoded in specification. In some implementations, being hard encoded into the specification can mean that tables storing the value pairs are maintained by a device such as a UE. In such implementations, the value pair $<N_{SC}, N_{symb}>$ can equal $<2,2>$ or $<4,1>$ assuming $N_{RE}=4$. Alternatively, the value pair $<N_{SC}, N_{symb}>$ in such implementations can equal $<2,3>$ or $<3,2>$ or $<6,1>$ assuming $N_{RE}=6$. In yet other implementations, a hybrid approach may be employed. That is, the set of MRP patterns can be first hard-encoded in specification. Then, one of these hard-encoded MRP pattern can be configured by UE-dedicated RRC Signaling by pointing to the pattern index.

Two approaches may be utilized in order to facilitate RE mapping of the MRP pattern. In some implementations, for example, an MRP can be defined as $N_{RE}$ consecutive REs with $N_{SC}$ REs in the frequency-domain and $N_{symb}$ in the time-domain. Alternatively, an MRP can be defined as $N_{RE}$ non-consecutive REs either in time-domain or frequency-domain or both.

RE Mapping of the MRP Pattern Using Consecutive REs

The present disclosure can facilitate RE mapping of MRP patterns using consecutive REs in a number of different ways. For example, in some implementations, the UE can be provided with the first Subcarrier (SC) location $k_0$ and the first symbol location so by UE-dedicated RRC signaling. In some implementations, the value of $s_0$ can be defined relative to the start of the scheduled PUSCH resources.

Figure 4:
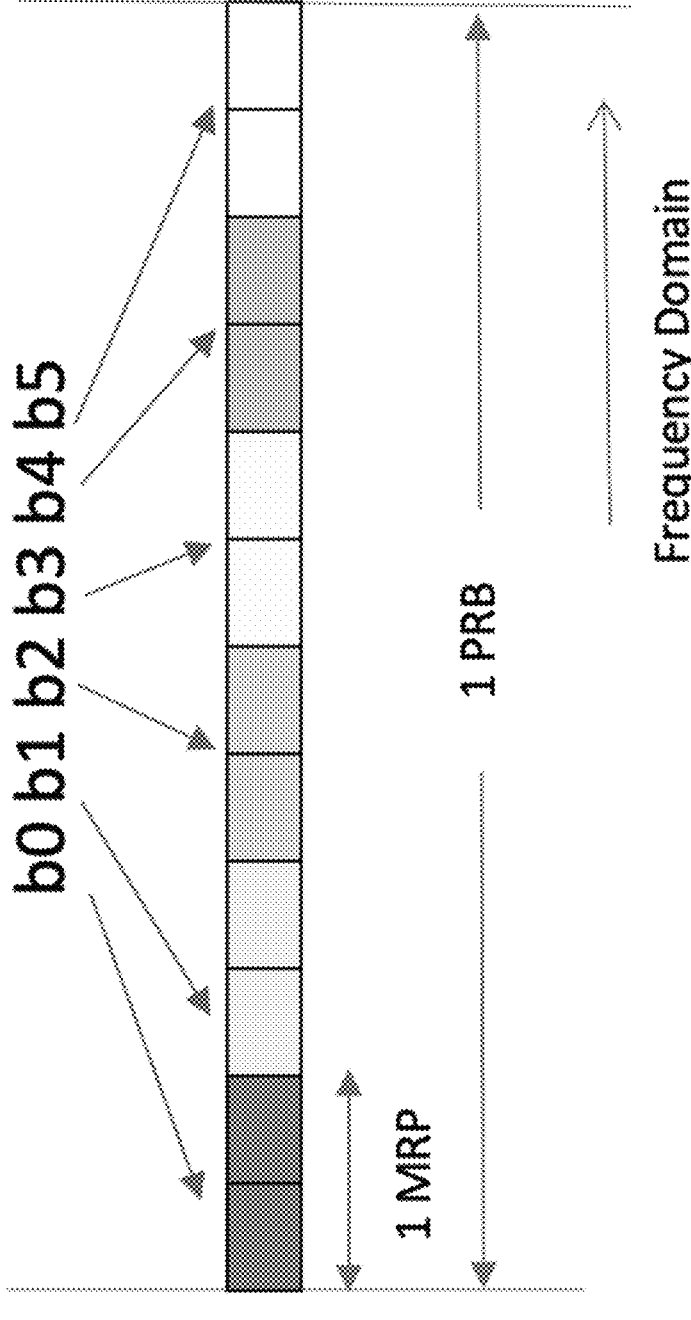
FIG. 4 is a diagram of a visualization of an example of a bitmapped-based muted resource element patter (MRP) function.

In some implementations, a bitmap approach may be employed. In such implementations, SCs within a PRB are grouped into $$N_{group} = N_{sc}^{RB}/N_{sc}MRPs$$

with each MRP including of $N_{SC}$ SCs. Then, a $N_{group}$ bitmap with one-to-one mapping between a bit in bitmap and a respective MRP group is introduced. One bitmap setting is provided to UE by high-layers to indicate the selected MRP index. As one example shown in FIG. 4, a bitmap of $$N_{group} = N_{sc}^{RB}/N_{sc} = 12/2 = 6$$

is used to signal the one selected MRP. The bitmap with value of '100000' indicates the MRP #0 is selected to mute for interference measurement in frequency-domain.

In yet other implementations, an implicit determination approach can be employed. In such implementations, the $k_0$ and $s_0$ values can be implicitly determined. For example, the $k_0$ value may be determined as the lowest Subcarrier Spacing (SCS) that is not used by Cat-1 DMRS group. Then, the value of $s_0$ can be determined as the first $N_{symb}$ consecutive symbols in the scheduled PUSCH resources that does not carry DMRS of PUSCH or the first $N_{symb}$ consecutive symbols in the scheduled PUSCH resources after the DMRS symbols of PUSCH. In such implementations, the $s_0$ value may be varied depending on the PUSCH mapping type.

Figures 5A, 5B, 5C:
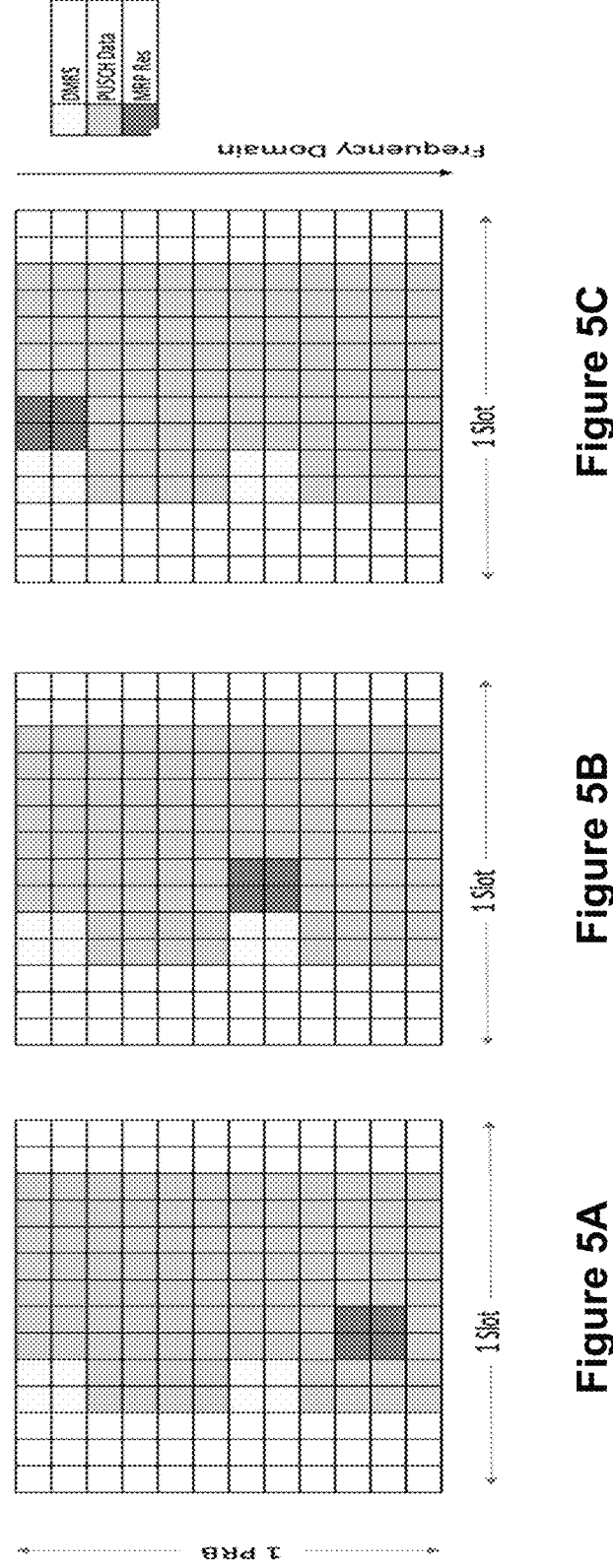
FIG. 5A is a diagram of a visualization of an example of a novel MRP pattern determination.
FIG. 5B is a diagram of a visualization of an example of another novel MRP pattern design.
FIG. 5C is a diagram of a visualization of an example of an MRP pattern design.
Figures 6A, 6B, 6C, 6D, 6E:
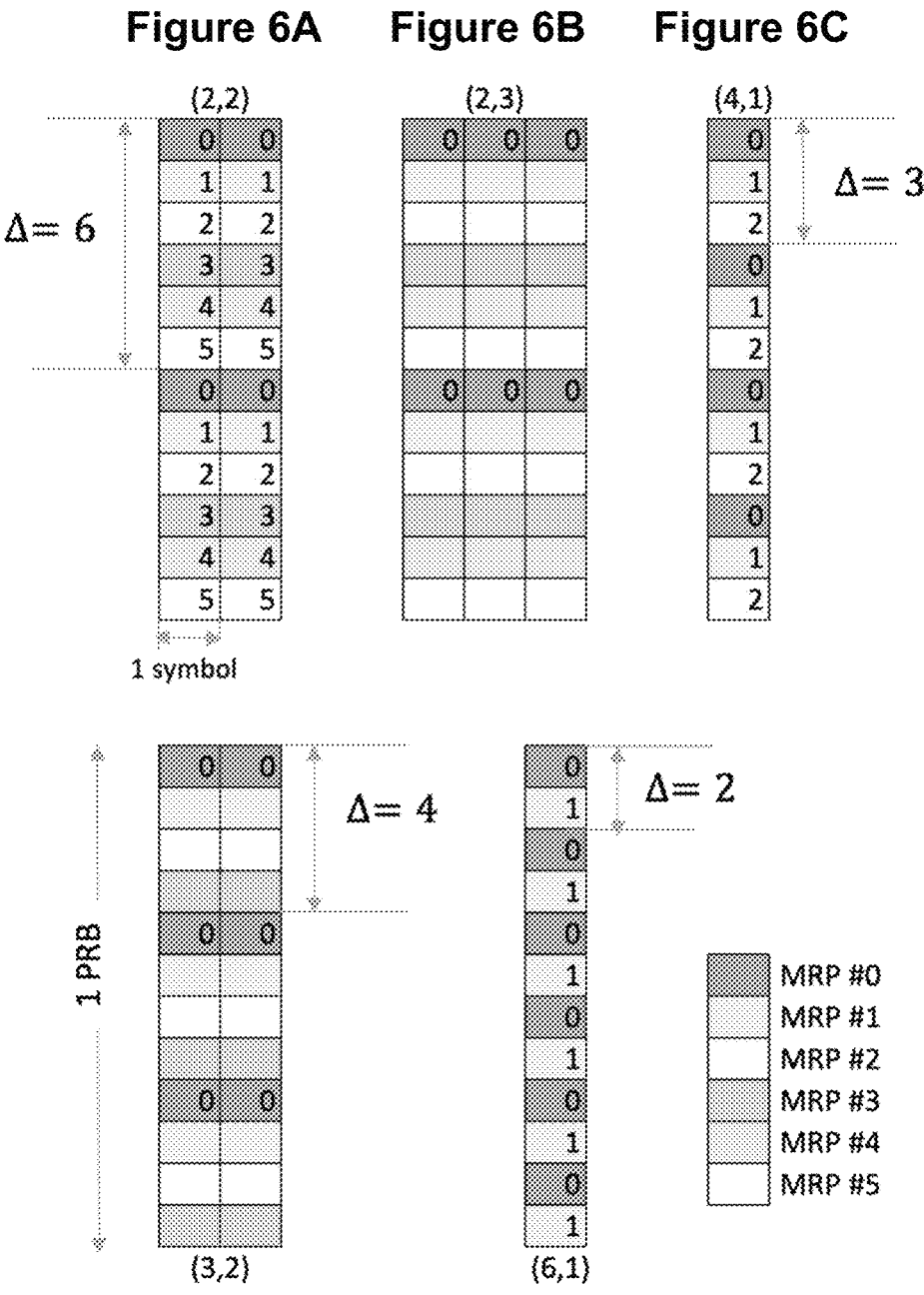
FIG. 6A is a diagram of a visualization of an example of an MRP pattern design having a frequency distance $\Delta=6$ and pattern (2,2).
FIG. 6B is a diagram of a visualization of an example of an MRP pattern design having a frequency distance $\Delta=6$ and pattern (2, 3).
FIG. 6C is a diagram of a visualization of an example of an MRP pattern design having a frequency distance Δ=3 and a pattern (4,1).
FIG. 6D is a diagram of a visualization of an example of an MRP pattern design having a frequency distance Δ=4 and a pattern (3,2).
FIG. 6E is a diagram of a visualization of an example of an MRP pattern design having a frequency distance Δ=2 and a pattern of (6,1).

FIGS. 5A-5C illustrate three embodiments of MRP patterns in accordance with the proposed in the aforementioned signaling approaches. It was assumed that UE is scheduled with PUSCH mapping TypeB starting from symbol index #3 with 9-symbols duration. The transform precoder is disabled. DMRS type 2 is used and Max length is equal to 2. Furthermore, the rank-1 is used and Antenna port IE is set as '12' i.e. Antenna port '0' is used for data transmission. In addition, MRP pattern $<2,2>$ is used for inference measurement in these embodiments.

In FIG. 5A, a UE may be provided by higher-layers as: $k_0=1$, $s_0=2$ (note, it is relative to the starting symbol of PUSCH). It should be noted that this pattern is NOT supported by the implementation of 5B.

In FIG. 5B, a UE may be provided with bitmap configuration as '000100' to select the MRP index #3 for interference measurement purpose. In the time domain, the UE may be separately indicated with '$s_0=2$' as in Opt.1.

In FIG. 5C, the $k_0$ value is determined as the lowest SCS that is not used by Cat-1 DMRS group. Assuming Antenna Port IE is set as '12', the CDM DMRS group $<0,1>$ are Cat-1 group. Correspondingly, $k_0=4$, $s_0=2$.

RE Mapping of the MRP Patter Using Non-Consecutive REs

In some implementations, the frequency distance $\Delta$ between two adjacent MRP REs is determined based on the number of MRP REs in a single PRB $N_{sc}$. In some implementations, $$\Delta = \frac{N_{sc}^{RB}}{N_{sc}}.$$

Table 3 provides the $\Delta$ values for different non-consecutive MRP patterns.

TABLE 3

|  | $<2, 2>, <2, 3>$ | $<4, 1>$ | $<3, 2>$ | $<6, 1>$ |
|---|---|---|---|---|
| $\Delta$ | 6 | 3 | 4 | 2 |

The starting symbol so may be either explicitly provided in RRC signaling or implicitly determined. If implicitly determined, the value of $s_0$ can be determined as the first $N_{symb}$ consecutive symbols in the scheduled PUSCH resources that does not carry DMRS of PUSCH or the first $N_{symb}$ consecutive symbols in the scheduled PUSCH resources after the DMRS symbols of PUSCH. In such implementations, the $s_0$ value may be varied depending on the PUSCH mapping type.

In such implementations, dthere are in total $\Delta=2/3/4/6$ interleaved MRP patterns within a PRB, as illustrated in FIGS. 6A-6E. Accordingly, various approaches can be considered for MRP Pattern indication. In some implementations, for example, a single MRP can be provided by higher-layers such as, for example, RRC signaling. Alternatively, a hybrid approach may be employed. In such implementations, a UE can be provided with a set of MRP patterns by RRC signaling first. Then, one of these configured MRP patterns can be signaled using a new MAC CE or via scheduling DCI.

In some implementations, a subset of a predefined DMRS CDM group can be selected for use as an MRP pattern. A variety of approaches may be considered to use a subset of DMRS CDM group, either Cat-1 or Cat-2, as MRP pattern for interference measurement purpose.

In some implementations, for example, a set of MRP patterns can be hard-encoded into specification by grouping a subset of REs in a DMRS CDM group, as depicted in FIGS. 7A, 7B, 10A, and 10B. Different patterns can be predefined for all or subset of MRP patterns $<N_{SC}, N_{symb}>=<2,2>,<3,2>,<3,1>,<4,1>,<6,1>$. In some implementations, different MRP patterns can be supported based on DMRS pattern type and DMRS symbol number, as shown in Table 4 below.

TABLE 4

|  | Single-Symbol | Double-Symbol |
| --- | --- | --- |
| Type-1 DMRS | <3, 1>, <6, 1> | <2, 2>, <3, 1>, <3, 2> |
| Type-2 DMRS | <4, 1> | <2, 2>, <4, 1> |

As shown in Table 4, for double-symbol DMRS pattern, a double-symbol MRP pattern is more feasible such that UE can perform power boosting for PUSCH DMRS REs that is frequency division multiplexing with the double-symbol MRP. In some implementations, patterns can be varied depending on the number of DMRS symbols i.e. 1 or 2 as well as the DMRS Type, i.e. Type 1 or Type 2.

For the existing Type-2 DMRS pattern as shown in FIGS. 10A and 10B, it includes two adjacent SC over which a length-2 OCC is used to separate the two antenna port sharing the same set of SCs, which is named as one CDM 'subgroup' hereinafter for description. There are two such CDM subgroups for one CDM group in each PRB. One example was provided in FIG. 6. One Type-2 DMRS CDM group #0 is divided into two sub-groups i.e. Subgroup #0 and Subgroup #1.

In some implementations, the DMRS CDM group where the PUSCH DMRS is located can not be used for MRP pattern. For Type-1 DMRS Pattern, the number of symbols for MRP in time-domain may be same as that of PUSCH DMRS.

For a single-symbol Type-1 DMRS, as illustrated in FIGS. 8A-8C, the following MRP pattern may be considered:

Pattern (6,1) shown in FIG. 8A: 1-bit flag may be added into DCI Format with the following definition:
The value '0': Indicates the MRP is disabled.
The value '1': Indicates the CDM group that is not used by PUSCH DMRS is served as MRP.
Pattern (3,1): For each CDM group, there are two interlaces where interlace m € {0,1}
First implementation shown in FIG. 8B: Interlace m includes SC {$k_0$+m* 6, $k_0$+m*6+2, $k_0$+m*6+4}; or
Second implementation shown in FIG. 8C: Interlace m includes SC {$k_0$+m* 2, $k_0$+m*2+4, $k_0$+m*2+8},
Where $k_0$ is the lowest SC of the CDM group that is not used as PUSCH DMRS.
One of Alt. 1-1 and Alt. 1-2 may be hard-encoded in specification.
A 2-bits field may be added into the scheduling DCI to indicate the interlace index of the unused CDM group with one-to-one mapping.
Code-state '00' indicates the MRP is disabled for this scheduled PUSCH.
For a double-symbol Type-1 DMRS, as illustrated in FIGS. 9A-9C, the following MRP patterns may be considered:
Pattern (2,2): For each CDM group, there are three interlaces m E {0,1,2}
First implementation shown in FIG. 9B: Interlace 'm' includes SC {$k_0$+m*4, $k_0$+m*4+2}; or,
Second implementation shown in FIG. 9C: Interlace 'm' includes SC {$k_0$+m*2, $k_0$+m*2+6},
Where $k_0 \epsilon \{0,1\}$ is the lowest SC of the CDM group that is not used as PUSCH DMRS.
Pattern (3,2) shown in FIG. 9C: For each CDM group, there are three interlaces m∈{0,1}
Interlace 'm' includes SC {$k_0$+m*2, $k_0$+m*2+4, $k_0$+m*2+8}
Where $k_0 \epsilon \{0,1\}$ is the lowest SC of the CDM group that is not used as PUSCH DMRS.
For Type 2 DMRS pattern, a single-symbol pattern or a double-symbol MRP pattern can be considered. A Single-symbol DMRS pattern can use each of the REs in a single CDM group 'Y' e.g. Y=1, including both subgroup #0 and subgroup #1.

Figures 11A, 11B:
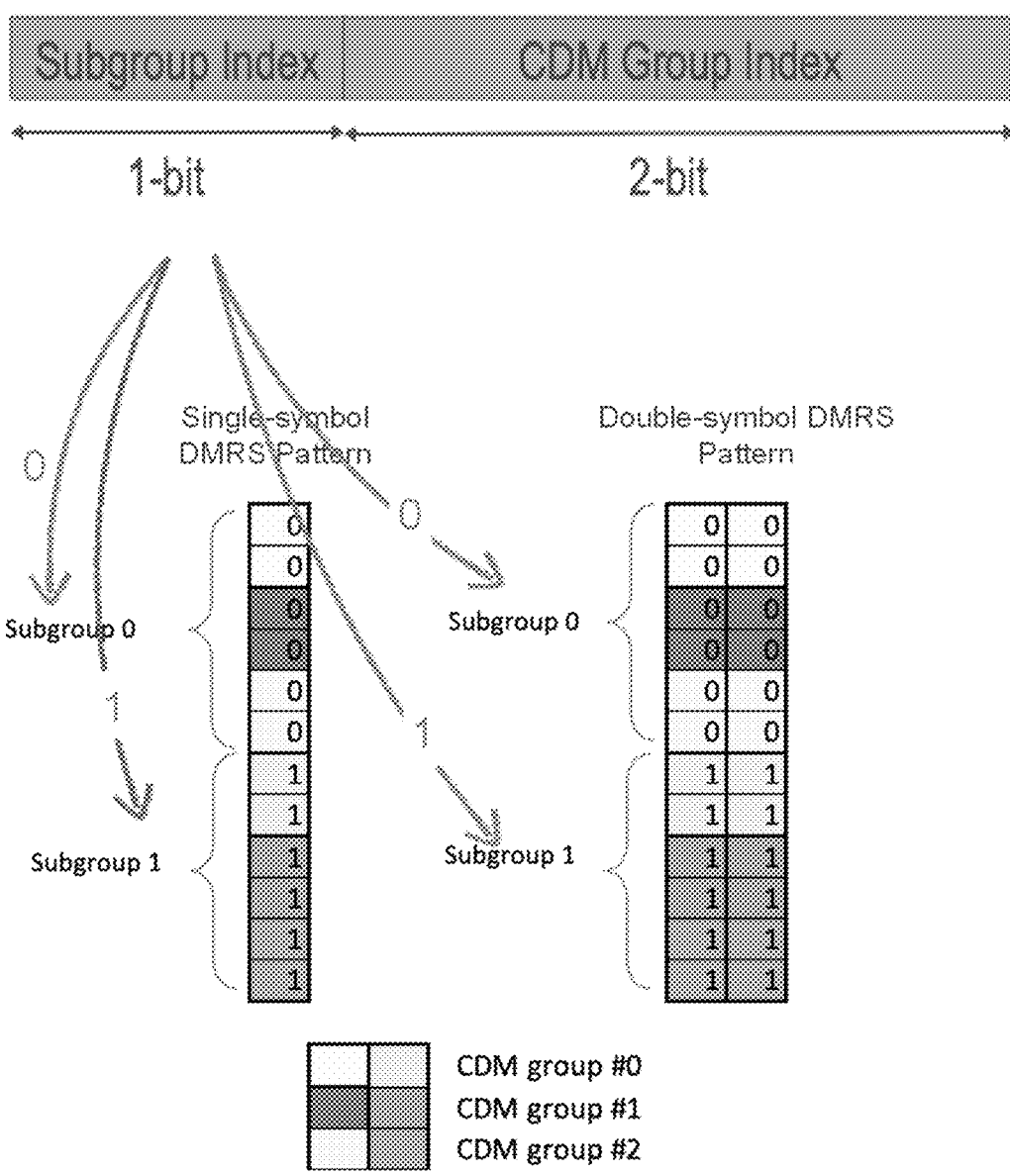
FIG. 11A is a diagram of a visualization of a DCI that includes a 1-bit subgroup index field.
FIG. 11B is a diagram of a visualization of an example of a single-symbol Type 2 DMRS-Group Based MRP design and a double-symbol Type 2 DMRS-Group Based MRP design.
Figure 11C:
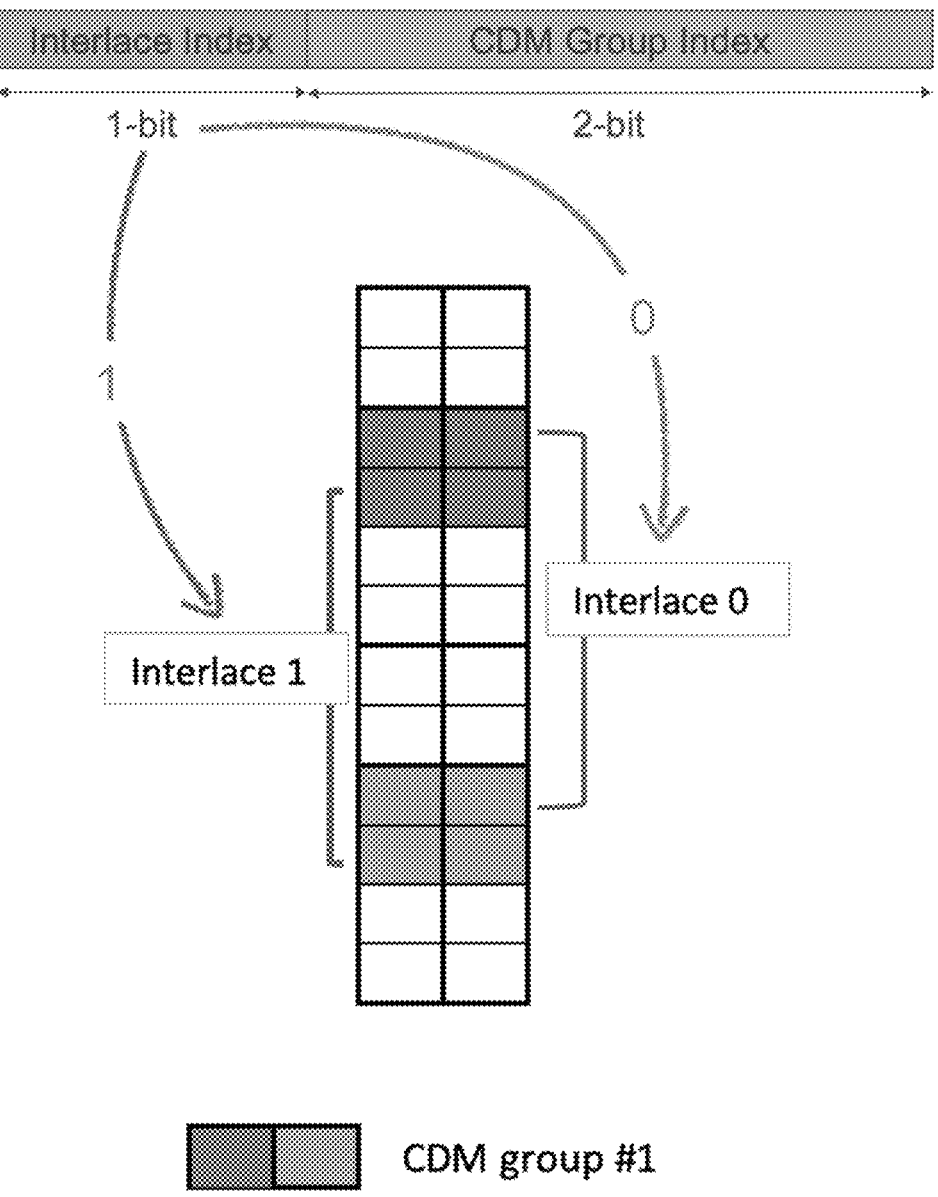
FIG. 11C is a diagram of a visualization of an alternative double-symbol Type 2 DMRS-Group Based MRP design.

For Double-symbol DMRS Pattern, at least two alternative implementations can be considered. These include a first implementation using subgroup X in a single CDM group Y or using RES from two subgroups of a single CDM group, as shown in FIG. 11C. In some implementations, for example, a subgroup X can be used in a single CDM group Y as shown in FIG. 11B. The Subgroup 'X' Indication is shown in FIG. 8 and includes a 1-bit Subgroup Index field that can be added into the existing DCI. The value '0' for the 1-bit subgroup index field indicates the subgroup #0 and a value '1' for the 1-bit subgroup index field indicates the subgroup #1. Alternatively, in other implementations, REs can selected for muting from two subgroups of a single CDM group (See details in following slides).

In some implementations, a single-symbol and Double symbol DMRS pattern having the CDM group index 'Y' may be determined in a variety of different ways. For example, in some implementations, the CDM group index 'Y' can be explicitly indicated as part of DCI Format. In instances of this implementation, for example, a 2-bit bitmap CDM group index field may be added to indicate one corresponding CDM group excluding the one used by PUSCH DMRS. In such implementations, a state '00' indicates to disable MRP for this scheduled PUSCH.

Alternatively, in other implementations, the CDM group index 'Y' can be implicitly determined. In such implementations, after excluding PUSCH DMRS group, the CDM group with lowest index is used as MRP. Alternatively, in yet other implementations, the CDM group index 'Y' can be explicitly configured by RRC signaling in a semi-static manner. In such implementations, the Subgroup Index or CDM group may be updated by a new MAC CE.

By way of example and with reference to a double-symbol DMRS pattern, assume that Antenna port IE indicates port #0 and Number of CDM groups without data is '1'. Correspondingly, CDM group #0 can not be used for MRP as it includes PUSCH DMRS. Accordingly, Subgroup #0 in CDM group #1 may then be indicated for MRP pattern by setting the CDM Subgroup Index field to be '0' and CDM group index field to be '10'.

In some implementations, two interlaces can be defined for a DMRS CDM group, as depicted in FIG. 11B, where interlace m E {0,1} includes subcarrier {$k_0$+m, $k_0$+6+m} with $k_0$ being the lowest SC of per subgroup of the DMRS CDM group. In such implementations, there are a variety of options for configuration of an MRP resource. In some implementations, for example, a 2-bit bitmap can be used to indicate CDM group index in DCI Format. In such implementations, a new 1-bit field interlace index may be added into DCI Format, as shown in FIG. 11C. In such implementations, a Value '0' in the 1-bit field indicates the interlace #0 and a value '1' in the 1-bit field indicates the interlace #1.

Alternatively, in other implementations, configuration of an MRP resource can be achieved using implicit determination. In such implementations excluding PUSCH DMRS group, the CDM group with lowest index is used as MRP. In yet other implementations, the Interlace index and/or CDM group index can be provided in UE-dedicated RRC signaling. In such implementations, the interlace Index or CDM group can be updated by a new MAC CE.

FIG. 12 is flowchart of an example of a process 1200 for muting resource elements used for wireless communications. In one aspect, a UE can begin the process 1200 by obtaining configuration data that indicates a frequency density of muted RBs (1210). In some implementations, the UE can obtain data indicating a muted TB interval N. In such implementations, the UE can generate muted RBs for every N RBs. In other implementations, the UE can obtain a default frequency density value that is hard-coded by specification to minimize signaling overhead.

The UE can continue execution of the process 200 by identifying, based on a value of an antenna ports information element in downlink control information (DCI) that schedules a PUSCH transmission, a group of REs within the muted RBs (1220). In some implementations, the UE can identify a set of REs based on a predefined DMRS CDM group. In other implementations, the UE can generate a muted resource patter that does not overlap with a pre-defined DMRS CDM group. Durign PUSCH transmission, a UE will not transmit on resource elements, of a muted resource block, that have been muted.

The UE can determine, a muted resource pattern (MRP) within the RBs for the scheduled PUSCH based on the frequency density of the muted resource blocks and the identified group of resource elements (1230). This can include, for example, determining a pattern of RBs based on the frequency density that are to have particular REs muted, with the muted REs being those REs identified at stage 1220. A UE will note transmit on a muted RE during PUSCH. The UE can conclude process 200 by transmitting an allocation of RBs for PUSCH without transmission on the identified group of resource elements of the determined MRP.

Figure 13:
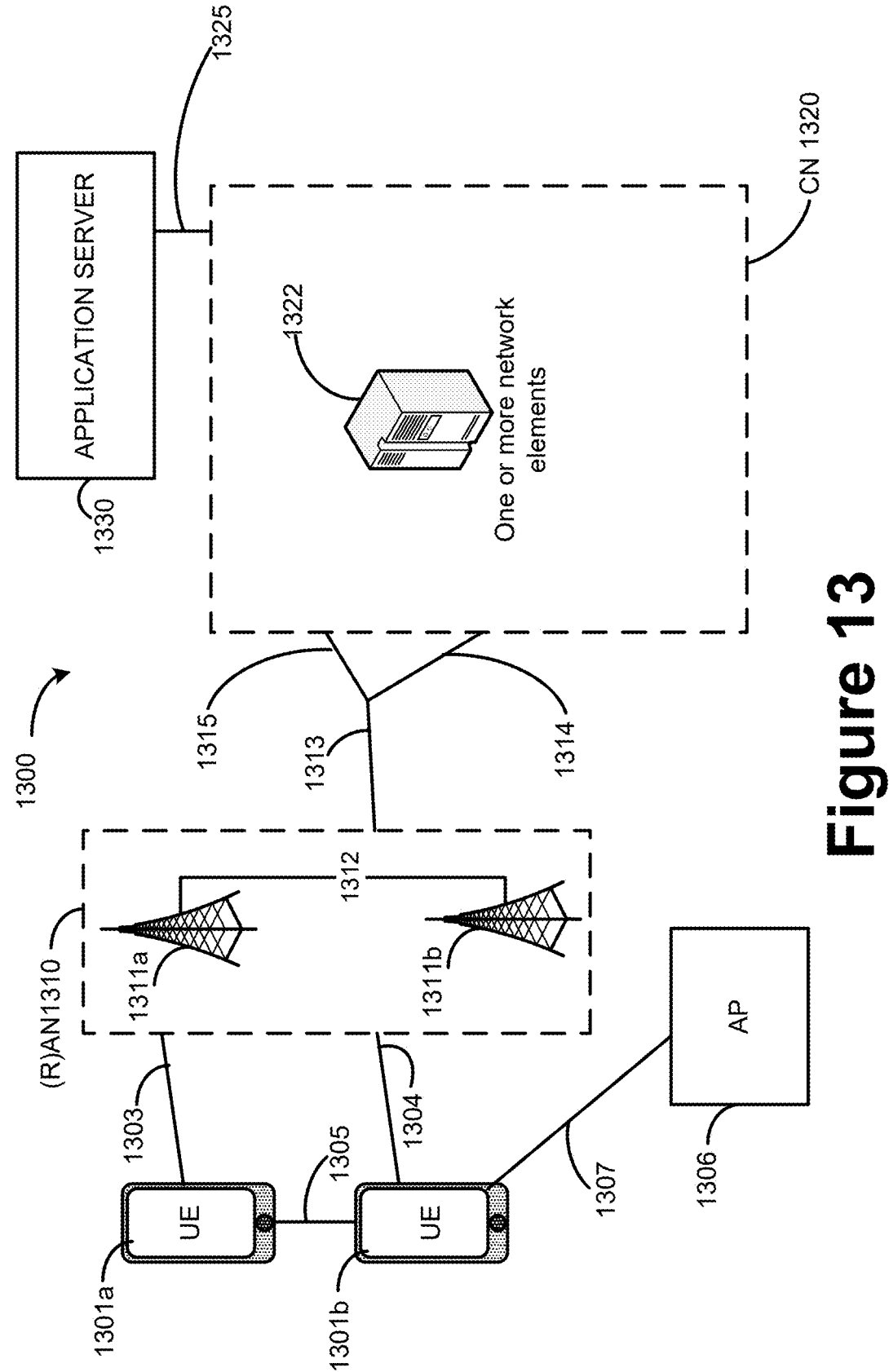
FIG. 13 illustrates an example of a wireless communication system.

FIG. 13 illustrates an example of a wireless communication system 1300. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 1300 is described in the context of Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 1300 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX®, etc.), or the like.

As shown by FIG. 13, the system 1300 includes UE 1301a and UE 1301b (collectively referred to as "UEs 1301" or "UE 1301"). In this example, UEs 1301 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1301 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 may be configured to connect, for example, communicatively couple, with RAN 1310. In embodiments, the RAN 1310 may be an NG RAN or a 5G RAN, an E-UTRAN, or a legacy RAN, such as a UTRAN or GERAN. As used herein, the term "NG RAN" or the like may refer to a RAN 1310 that operates in an NR or 5G system 1300, and the term "E-UTRAN" or the like may refer to a RAN 1310 that operates in an LTE or 4G system 1300. The UEs 1301 utilize connections (or channels) 1303 and 1304, respectively, each of which comprises a physical communications interface or layer (discussed in further detail below).

In this example, the connections 1303 and 1304 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 1301 may directly exchange communication data via a ProSe interface 1305. The ProSe interface 1305 may alternatively be referred to as a SL interface 1305 and may comprise one or more logical channels, including but not limited to a PSCCH, a PSSCH, a PSDCH, and a PSBCH.

The UE 1301b is shown to be configured to access an AP 1306 (also referred to as "WLAN node 1306," "WLAN 1306," "WLAN Termination 1306," "WT 1306" or the like) via connection 1307. The connection 1307 can comprise a local wireless connection, such as a connection consistent with any IEEE 802.11 protocol, wherein the AP 1306 would comprise a wireless fidelity (Wi-Fi®) router. In this example, the AP 1306 is shown to be connected to the Internet without connecting to the core network of the wireless system (described in further detail below). In various embodiments, the UE 1301b, RAN 1310, and AP 1306 may be configured to utilize LWA operation and/or LWIP operation. The LWA operation may involve the UE 1301b in RRC_CONNECTED being configured by a RAN node 1311a-b to utilize radio resources of LTE and WLAN. LWIP operation may involve the UE 1301b using WLAN radio resources (e.g., connection 1307) via IPsec protocol tunneling to authenticate and encrypt packets (e.g., IP packets) sent over the connection 1307. IPsec tunneling may include encapsulating the entirety of original IP packets and adding a new packet header, thereby protecting the original header of the IP packets.

The RAN 1310 can include one or more AN nodes or RAN nodes 1311a and 1311b (collectively referred to as "RAN nodes 1311" or "RAN node 1311") that enable the connections 1303 and 1304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1311 that operates in an NR or 5G system 1300 (for example, a gNB), and the term "E-UTRAN node" or the like may refer to a RAN node 1311 that operates in an LTE or 4G system 1300 (e.g., an eNB). According to various embodiments, the RAN nodes 1311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1311 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1311; a MAC/PHY split wherein RRC, PDCP, RLC, and MAC layers are operated by the CRAN/vBBUP and the PHY layer is operated by individual RAN nodes 1311; or a "lower PHY" split wherein RRC, PDCP, RLC, MAC layers and upper portions of the PHY layer are operated by the CRAN/vBBUP and lower portions of the PHY layer are operated by individual RAN nodes 1311. This virtualized framework allows the freed-up processor cores of the RAN nodes 1311 to perform other virtualized applications. In some implementations, an individual RAN node 1311 may represent individual gNB-DUs that are connected to a gNB-CU via individual F1 interfaces (not shown by FIG. 13). In these implementations, the gNB-DUs may include one or more remote radio heads or RFEMs (see, e.g., FIG. 16), and the gNB-CU may be operated by a server that is located in the RAN 1310 (not shown) or by a server pool in a similar manner as the CRAN/vBBUP. Additionally or alternatively, one or more of the RAN nodes 1311 may be next generation eNBs (ng-eNBs), which are RAN nodes that provide E-UTRA user plane and control plane protocol terminations toward the UEs 1301, and are connected to a 5GC (e.g., CN 1520 of FIG. 15) via an NG interface (discussed infra).

In V2X scenarios one or more of the RAN nodes 1311 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1301 (VUEs 1301). The RSU may also include internal data storage circuitry to store intersection map geometry, traffic statistics, media, as well as applications/software to sense and control ongoing vehicular and pedestrian traffic. The RSU may operate on the 5.9 GHZ Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1311 can terminate the air interface protocol and can be the first point of contact for the UEs 1301. In some embodiments, any of the RAN nodes 1311 can fulfill various logical functions for the RAN 1310 including, but not limited to, radio network controller (RNC) functions such as radio bearer management, uplink and downlink dynamic radio resource management and data packet scheduling, and mobility management.

In embodiments, the UEs 1301 can be configured to communicate using OFDM communication signals with each other or with any of the RAN nodes 1311 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 to the UEs 1301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1301 and the RAN nodes 1311 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHZ, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 1301 and the RAN nodes 1311 may operate using LAA, eLAA, and/or feLAA mechanisms. In these implementations, the UEs 1301 and the RAN nodes 1311 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1301 RAN nodes 1311, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1301, AP 1306, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds(s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1301 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1301. The PDCCH carries information about the transport format and resource allocations related to the PDSCH channel, among other things. It may also inform the UEs 1301 about the transport format, resource allocation, and HARQ information related to the uplink shared channel. Typically, downlink scheduling (assigning control and shared channel resource blocks to the UE 1301*b* within a cell) may be performed at any of the RAN nodes 1311 based on channel quality information fed back from any of the UEs 1301. The downlink resource assignment information may be sent on the PDCCH used for (e.g., assigned to) each of the UEs 1301.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1311 may be configured to communicate with one another via interface 1312. In embodiments where the system 1300 is an LTE system (e.g., when CN 1320 is an EPC 1420 as in FIG. 14), the interface 1312 may be an X2 interface 1312. The X2 interface may be defined between two or more RAN nodes 1311 (e.g., two or more eNBs and the like) that connect to EPC 1320, and/or between two eNBs connecting to EPC 1320. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1301 from an SeNB for user data; information of PDCP PDUs that were not delivered to a UE 1301; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1300 is a 5G or NR system (e.g., when CN 1320 is an 5GC 1520 as in FIG. 15), the interface 1312 may be an Xn interface 1312. The Xn interface is defined between two or more RAN nodes 1311 (e.g., two or more gNBs and the like) that connect to 5GC 1320, between a RAN node 1311 (e.g., a gNB) connecting to 5GC 1320 and an eNB, and/or between two eNBs connecting to 5GC 1320. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1301 in a connected mode (e.g., CM-CONNECTED) including functionality to manage the UE mobility for connected mode between one or more RAN nodes 1311. The mobility support may include context transfer from an old (source) serving RAN node 1311 to new (target) serving RAN node 1311; and control of user plane tunnels between old (source) serving RAN node 1311 to new (target) serving RAN node 1311. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1310 is shown to be communicatively coupled to a core network-in this embodiment, core network (CN) 1320. The CN 1320 may comprise a plurality of network elements 1322, which are configured to offer various data and telecommunications services to customers/subscribers (e.g., users of UEs 1301) who are connected to the CN 1320 via the RAN 1310. The components of the CN 1320 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1320 may be referred to as a network slice, and a logical instantiation of a portion of the CN 1320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1330 may be an element offering applications that use IP bearer resources with the core network (e.g., UMTS PS domain, LTE PS data services, etc.). The application server 1330 can also be configured to support one or more communication services (e.g., VOIP sessions, PTT sessions, group communication sessions, social networking services, etc.) for the UEs 1301 via the EPC 1320.

In embodiments, the CN 1320 may be a 5GC (referred to as "5GC 1320" or the like), and the RAN 1310 may be connected with the CN 1320 via an NG interface 1313. In embodiments, the NG interface 1313 may be split into two parts, an NG user plane (NG-U) interface 1314, which carries traffic data between the RAN nodes 1311 and a UPF, and the S1 control plane (NG-C) interface 1315, which is a signaling interface between the RAN nodes 1311 and AMFs. Embodiments where the CN 1320 is a 5GC 1320 are discussed in more detail with regard to FIG. 15.

In embodiments, the CN 1320 may be a 5G CN (referred to as "5GC 1320" or the like), while in other embodiments, the CN 1320 may be an EPC). Where CN 1320 is an EPC (referred to as "EPC 1320" or the like), the RAN 1310 may be connected with the CN 1320 via an S1 interface 1313. In embodiments, the S1 interface 1313 may be split into two parts, an S1 user plane (S1-U) interface 1314, which carries traffic data between the RAN nodes 1311 and the S-GW, and the S1-MME interface 1315, which is a signaling interface between the RAN nodes 1311 and MMEs.

Figure 14:
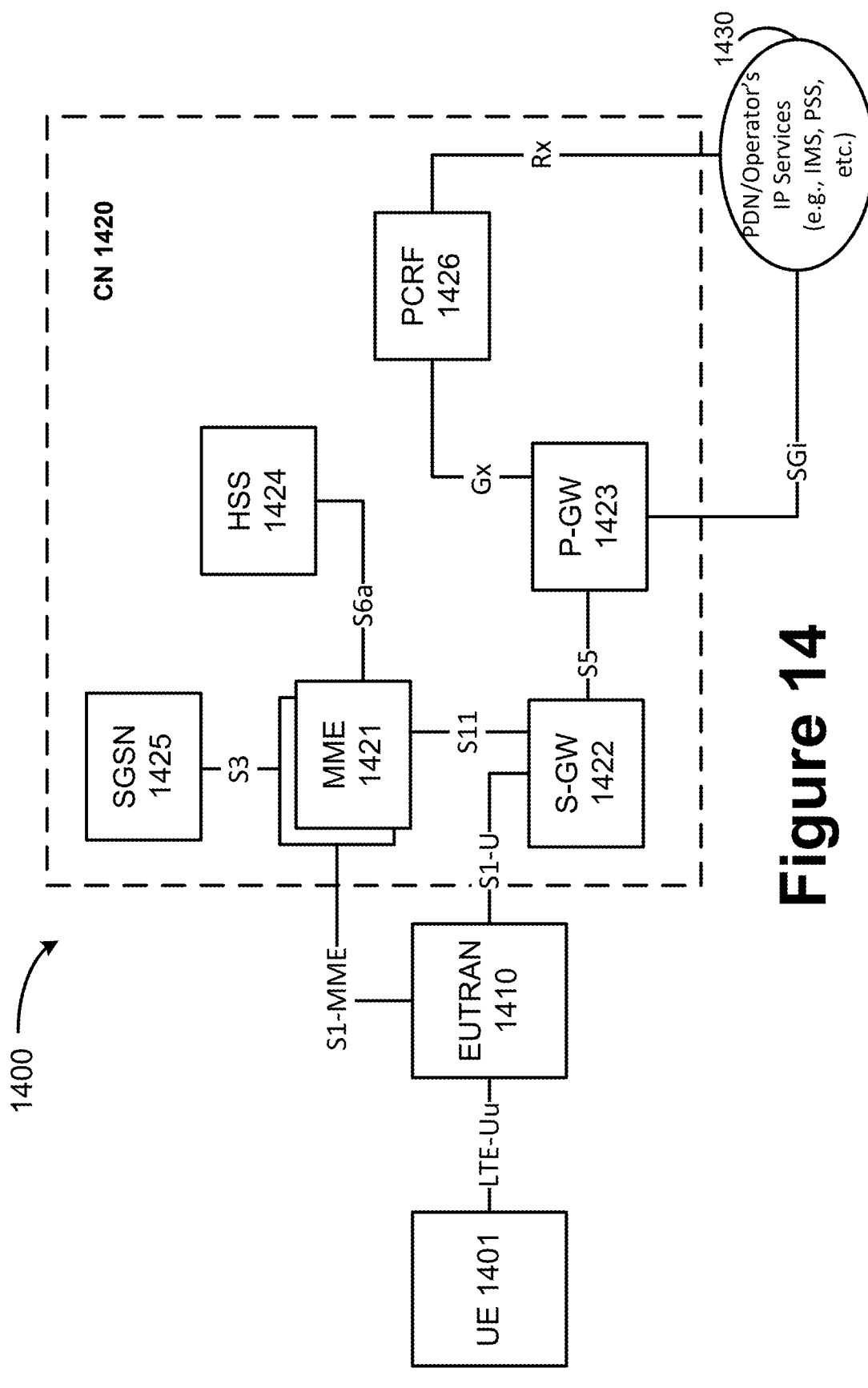
FIG. 14 illustrates an example architecture of a system

FIG. 14 illustrates an example architecture of a system 1400 including a first CN 1420, in accordance with various embodiments. In this example, system 1400 may implement the LTE standard wherein the CN 1420 is an EPC 1420 that corresponds with CN 1320 of FIG. 13. Additionally, the UE 1401 may be the same or similar as the UEs 1301 of FIG. 13, and the E-UTRAN 1410 may be a RAN that is the same or similar to the RAN 1310 of FIG. 13, and which may include RAN nodes 1311 discussed previously. The CN 1420 may comprise MMEs 1421, an S-GW 1422, a P-GW 1423, a HSS 1424, and a SGSN 1425.

The MMEs 1421 may be similar in function to the control plane of legacy SGSN, and may implement MM functions to keep track of the current location of a UE 1401. The MMEs 1421 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. That are used to maintain knowledge about a present location of the UE 1401, provide user identity confidentiality, and/or perform other like services to users/subscribers. Each UE 1401 and the MME 1421 may include an MM or EMM sublayer, and an MM context may be established in the UE 1401 and the MME 1421 when an attach procedure is successfully completed. The MM context may be a data structure or database object that stores MM-related information of the UE 1401. The MMEs 1421 may be coupled with the HSS 1424 via an Soa reference point, coupled with the SGSN 1425 via an S3 reference point, and coupled with the S-GW 1422 via an S11 reference point.

The SGSN 1425 may be a node that serves the UE 1401 by tracking the location of an individual UE 1401 and performing security functions. In addition, the SGSN 1425 may perform Inter-EPC node signaling for mobility between 2G/3G and E-UTRAN 3GPP access networks; PDN and S-GW selection as specified by the MMEs 1421; handling of UE 1401 time zone functions as specified by the MMEs 1421; and MME selection for handovers to E-UTRAN 3GPP access network. The S3 reference point between the MMEs 1421 and the SGSN 1425 may enable user and bearer information exchange for inter-3GPP access network mobility in idle and/or active states.

The HSS 1424 may comprise a database for network users, including subscription-related information to support the network entities' handling of communication sessions. The EPC 1420 may comprise one or several HSSs 1424, depending on the number of mobile subscribers, on the capacity of the equipment, on the organization of the network, etc. For example, the HSS 1424 can provide support for routing/roaming, authentication, authorization, naming/addressing resolution, location dependencies, etc. An S6a reference point between the HSS 1424 and the MMEs 1421 may enable transfer of subscription and authentication data for authenticating/authorizing user access to the EPC 1420 between HSS 1424 and the MMEs 1421.

The S-GW 1422 may terminate the S1 interface 1313 ("S1-U" in FIG. 14) toward the RAN 1410, and routes data packets between the RAN 1410 and the EPC 1420. In addition, the S-GW 1422 may be a local mobility anchor point for inter-RAN node handovers and also may provide an anchor for inter-3GPP mobility. Other responsibilities may include lawful intercept, charging, and some policy enforcement. The S11 reference point between the S-GW 1422 and the MMEs 1421 may provide a control plane between the MMEs 1421 and the S-GW 1422. The S-GW 1422 may be coupled with the P-GW 1423 via an S5 reference point.

The P-GW 1423 may terminate an SGi interface toward a PDN 1430. The P-GW 1423 may route data packets between the EPC 1420 and external networks such as a network including the application server 1330 (alternatively referred to as an "AF") via an IP interface 1325 (see e.g., FIG. 13). In embodiments, the P-GW 1423 may be communicatively coupled to an application server (application server 1330 of FIG. 13 or PDN 1430 in FIG. 14) via an IP communications interface 1325 (see, e.g., FIG. 13). The S5 reference point between the P-GW 1423 and the S-GW 1422 may provide user plane tunneling and tunnel management between the P-GW 1423 and the S-GW 1422. The S5 reference point may also be used for S-GW 1422 relocation due to UE 1401 mobility and if the S-GW 1422 needs to connect to a non-collocated P-GW 1423 for the required PDN connectivity. The P-GW 1423 may further include a node for policy enforcement and charging data collection (e.g., PCEF (not shown)). Additionally, the SGi reference point between the P-GW 1423 and the packet data network (PDN) 1430 may be an operator external public, a private PDN, or an intra operator packet data network, for example, for provision of IMS services. The P-GW 1423 may be coupled with a PCRF 1426 via a Gx reference point.

PCRF 1426 is the policy and charging control element of the EPC 1420. In a non-roaming scenario, there may be a single PCRF 1426 in the Home Public Land Mobile Network (HPLMN) associated with a UE 1401's Internet Protocol Connectivity Access Network (IP-CAN) session. In a roaming scenario with local breakout of traffic, there may be two PCRFs associated with a UE 1401's IP-CAN session, a Home PCRF (H-PCRF) within an HPLMN and a Visited PCRF (V-PCRF) within a Visited Public Land Mobile Network (VPLMN). The PCRF 1426 may be communicatively coupled to the application server 1430 via the P-GW 1423. The application server 1430 may signal the PCRF 1426 to indicate a new service flow and select the appropriate QoS and charging parameters. The PCRF 1426 may provision this rule into a PCEF (not shown) with the appropriate TFT and QCI, which commences the QoS and charging as specified by the application server 1430. The Gx reference point between the PCRF 1426 and the P-GW 1423 may allow for the transfer of QoS policy and charging rules from the PCRF 1426 to PCEF in the P-GW 1423. An Rx reference point may reside between the PDN 1430 (or "AF 1430") and the PCRF 1426.

Figure 15:
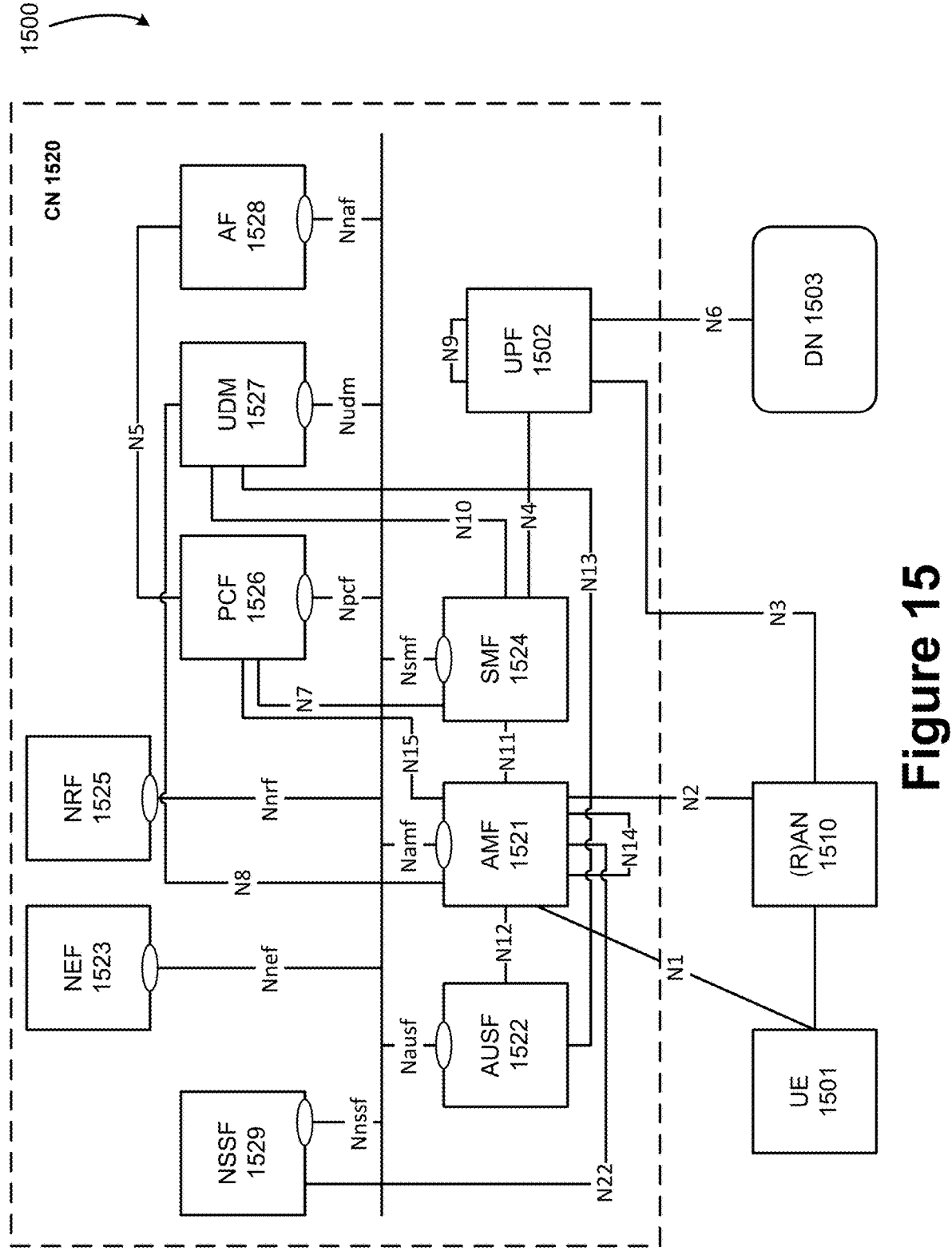
FIG. 15 illustrates an architecture of a system including a second CN.

FIG. 15 illustrates an architecture of a system 1500 including a second CN 1520 in accordance with various embodiments. The system 1500 is shown to include a UE 1501, which may be the same or similar to the UEs 1301 and UE 1401 discussed previously; a (R)AN 1510, which may be the same or similar to the RAN 1310 and RAN 1410 discussed previously, and which may include RAN nodes 1311 discussed previously; and a DN 1503, which may be, for example, operator services, Internet access or 3rd party services; and a 5GC 1520. The 5GC 1520 may include an AUSF 1522; an AMF 1521; a SMF 1524; a NEF 1523; a PCF 1526; a NRF 1525; a UDM 1527; an AF 1528; a UPF 1502; and a NSSF 1529.

The UPF 1502 may act as an anchor point for intra-RAT and inter-RAT mobility, an external PDU session point of interconnect to DN 1503, and a branching point to support multi-homed PDU session. The UPF 1502 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1502 may include an uplink classifier to support routing traffic flows to a data network. The DN 1503 may represent various network operator services, Internet access, or third party services. DN 1503 may include, or be similar to, application server 1330 discussed previously. The UPF 1502 may interact with the SMF 1524 via an N4 reference point between the SMF 1524 and the UPF 1502.

The AUSF 1522 may store data for authentication of UE 1501 and handle authentication-related functionality. The AUSF 1522 may facilitate a common authentication framework for various access types. The AUSF 1522 may communicate with the AMF 1521 via an N12 reference point between the AMF 1521 and the AUSF 1522; and may communicate with the UDM 1527 via an N13 reference point between the UDM 1527 and the AUSF 1522. Additionally, the AUSF 1522 may exhibit an Nausf service-based interface.

The AMF 1521 may be responsible for registration management (e.g., for registering UE 1501, etc.), connection management, reachability management, mobility management, and lawful interception of AMF-related events, and access authentication and authorization. The AMF 1521 may be a termination point for the N11 reference point between the AMF 1521 and the SMF 1524. The AMF 1521 may provide transport for SM messages between the UE 1501 and the SMF 1524, and act as a transparent proxy for routing SM messages. AMF 1521 may also provide transport for SMS messages between UE 1501 and an SMSF (not shown by FIG. 15). AMF 1521 may act as SEAF, which may include interaction with the AUSF 1522 and the UE 1501, receipt of an intermediate key that was established as a result of the UE 1501 authentication process. Where USIM based authentication is used, the AMF 1521 may retrieve the security material from the AUSF 1522. AMF 1521 may also include a SCM function, which receives a key from the SEA that it uses to derive access-network specific keys. Furthermore, AMF 1521 may be a termination point of a RAN CP interface, which may include or be an N2 reference point between the (R)AN 1510 and the AMF 1521; and the AMF 1521 may be a termination point of NAS (N1) signaling, and perform NAS ciphering and integrity protection.

AMF 1521 may also support NAS signaling with a UE 1501 over an N3 IWF interface. The N3IWF may be used to provide access to untrusted entities. N3IWF may be a termination point for the N2 interface between the (R)AN 1510 and the AMF 1521 for the control plane, and may be a termination point for the N3 reference point between the (R)AN 1510 and the UPF 1502 for the user plane. As such, the AMF 1521 may handle N2 signaling from the SMF 1524 and the AMF 1521 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 1501 and AMF 1521 via an N1 reference point between the UE 1501 and the AMF 1521, and relay uplink and downlink user-plane packets between the UE 1501 and UPF 1502. The N3IWF also provides mechanisms for IPsec tunnel establishment with the UE 1501. The AMF 1521 may exhibit an Namf service-based interface, and may be a termination point for an N14 reference point between two AMFs 1521 and an N17 reference point between the AMF 1521 and a 5G-EIR (not shown by FIG. 15).

The UE 1501 may need to register with the AMF 1521 in order to receive network services. RM is used to register or deregister the UE 1501 with the network (e.g., AMF 1521), and establish a UE context in the network (e.g., AMF 1521). The UE 1501 may operate in an RM-REGISTERED state or an RM-DEREGISTERED state. In the RM DEREGISTERED state, the UE 1501 is not registered with the network, and the UE context in AMF 1521 holds no valid location or routing information for the UE 1501 so the UE 1501 is not reachable by the AMF 1521. In the RM REGISTERED state, the UE 1501 is registered with the network, and the UE context in AMF 1521 may hold a valid location or routing information for the UE 1501 so the UE 1501 is reachable by the AMF 1521. In the RM-REGISTERED state, the UE 1501 may perform mobility Registration Update procedures, perform periodic Registration Update procedures triggered by expiration of the periodic update timer (e.g., to notify the network that the UE 1501 is still active), and perform a Registration Update procedure to update UE capability information or to re-negotiate protocol parameters with the network, among others.

The AMF 1521 may store one or more RM contexts for the UE 1501, where each RM context is associated with a specific access to the network. The RM context may be a data structure, database object, etc. That indicates or stores, inter alia, a registration state per access type and the periodic update timer. The AMF 1521 may also store a 5GC MM context that may be the same or similar to the (E) MM context discussed previously. In various embodiments, the AMF 1521 may store a CE mode B Restriction parameter of the UE 1501 in an associated MM context or RM context. The AMF 1521 may also derive the value, when needed, from the UE's usage setting parameter already stored in the UE context (and/or MM/RM context).

CM may be used to establish and release a signaling connection between the UE 1501 and the AMF 1521 over the N1 interface. The signaling connection is used to enable NAS signaling exchange between the UE 1501 and the CN 1520, and comprises both the signaling connection between the UE and the AN (e.g., RRC connection or UE-N3IWF connection for non-3GPP access) and the N2 connection for the UE 1501 between the AN (e.g., RAN 1510) and the AMF 1521. The UE 1501 may operate in one of two CM states, CM-IDLE mode or CM-CONNECTED mode. When the UE 1501 is operating in the CM-IDLE state/mode, the UE 1501 may have no NAS signaling connection established with the AMF 1521 over the N1 interface, and there may be (R)AN 1510 signaling connection (e.g., N2 and/or N3 connections) for the UE 1501. When the UE 1501 is operating in the CM-CONNECTED state/mode, the UE 1501 may have an established NAS signaling connection with the AMF 1521 over the N1 interface, and there may be a (R)AN 1510 signaling connection (e.g., N2 and/or N3 connections) for the UE 1501. Establishment of an N2 connection between the (R)AN 1510 and the AMF 1521 may cause the UE 1501 to transition from CM-IDLE mode to CM-CONNECTED mode, and the UE 1501 may transition from the CM-CONNECTED mode to the CM-IDLE mode when N2 signaling between the (R)AN 1510 and the AMF 1521 is released.

The SMF 1524 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1501 and a data network (DN) 1503 identified by a Data Network Name (DNN). PDU sessions may be established upon UE 1501 request, modified upon UE 1501 and 5GC 1520 request, and released upon UE 1501 and 5GC 1520 request using NAS SM signaling exchanged over the N1 reference point between the UE 1501 and the SMF 1524. Upon request from an application server, the 5GC 1520 may trigger a specific application in the UE 1501. In response to receipt of the trigger message, the UE 1501 may pass the trigger message (or relevant parts/information of the trigger message) to one or more identified applications in the UE 1501. The identified application(s) in the UE 1501 may establish a PDU session to a specific DNN. The SMF 1524 may check whether the UE 1501 requests are compliant with user subscription information associated with the UE 1501. In this regard, the SMF 1524 may retrieve and/or request to receive update notifications on SMF 1524 level subscription data from the UDM 1527.

The SMF 1524 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1524 may be included in the system 1500, which may be between another SMF 1524 in a visited network and the SMF 1524 in the home network in roaming scenarios. Additionally, the SMF 1524 may exhibit the Nsmf service-based interface.

The NEF 1523 may provide means for securely exposing the services and capabilities provided by 3GPP network functions for third party, internal exposure/re-exposure, Application Functions (e.g., AF 1528), edge computing or fog computing systems, etc. In such embodiments, the NEF 1523 may authenticate, authorize, and/or throttle the AFs. NEF 1523 may also translate information exchanged with the AF 1528 and information exchanged with internal network functions. For example, the NEF 1523 may translate between an AF-Service-Identifier and an internal 5GC information. NEF 1523 may also receive information from other network functions (NFs) based on exposed capabilities of other network functions. This information may be stored at the NEF 1523 as structured data, or at a data storage NF using standardized interfaces. The stored information can then be re-exposed by the NEF 1523 to other NFs and AFs, and/or used for other purposes such as analytics. Additionally, the NEF 1523 may exhibit an Nnef service-based interface.

The NRF 1525 may support service discovery functions, receive NF discovery requests from NF instances, and provide the information of the discovered NF instances to the NF instances. NRF 1525 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1525 may exhibit the Nnrf service-based interface.

The PCF 1526 may provide policy rules to control plane function(s) to enforce them, and may also support unified policy framework to govern network behavior. The PCF 1526 may also implement an FE to access subscription information relevant for policy decisions in a UDR of the UDM 1527. The PCF 1526 may communicate with the AMF 1521 via an N15 reference point between the PCF 1526 and the AMF 1521, which may include a PCF 1526 in a visited network and the AMF 1521 in case of roaming scenarios. The PCF 1526 may communicate with the AF 1528 via an N5 reference point between the PCF 1526 and the AF 1528; and with the SMF 1524 via an N7 reference point between the PCF 1526 and the SMF 1524. The system 1500 and/or CN 1520 may also include an N24 reference point between the PCF 1526 (in the home network) and a PCF 1526 in a visited network. Additionally, the PCF 1526 may exhibit an Npcf service-based interface.

The UDM 1527 may handle subscription-related information to support the network entities' handling of communication sessions, and may store subscription data of UE 1501. For example, subscription data may be communicated between the UDM 1527 and the AMF 1521 via an N8 reference point between the UDM 1527 and the AMF. The UDM 1527 may include two parts, an application FE and a UDR (the FE and UDR are not shown by FIG. 15). The UDR may store subscription data and policy data for the UDM 1527 and the PCF 1526, and/or structured data for exposure and application data (including PFDs for application detection, application request information for multiple UEs 1501) for the NEF 1523. The Nudr service-based interface may be exhibited by the UDR 221 to allow the UDM 1527, PCF 1526, and NEF 1523 to access a particular set of the stored data, as well as to read, update (e.g., add, modify), delete, and subscribe to notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1524 via an N10 reference point between the UDM 1527 and the SMF 1524. UDM 1527 may also support SMS management, wherein an SMS-FE implements the similar application logic as discussed previously. Additionally, the UDM 1527 may exhibit the Nudm service-based interface.

The AF 1528 may provide application influence on traffic routing, provide access to the NCE, and interact with the policy framework for policy control. The NCE may be a mechanism that allows the 5GC 1520 and AF 1528 to provide information to each other via NEF 1523, which may be used for edge computing implementations. In such implementations, the network operator and third party services may be hosted close to the UE 1501 access point of attachment to achieve an efficient service delivery through the reduced end-to-end latency and load on the transport network. For edge computing implementations, the 5GC may select a UPF 1502 close to the UE 1501 and execute traffic steering from the UPF 1502 to DN 1503 via the N6 interface. This may be based on the UE subscription data, UE location, and information provided by the AF 1528. In this way, the AF 1528 may influence UPF (re) selection and traffic routing. Based on operator deployment, when AF 1528 is considered to be a trusted entity, the network operator may permit AF 1528 to interact directly with relevant NFs. Additionally, the AF 1528 may exhibit an Naf service-based interface.

The NSSF 1529 may select a set of network slice instances serving the UE 1501. The NSSF 1529 may also determine allowed NSSAI and the mapping to the subscribed S-NSSAIs, if needed. The NSSF 1529 may also determine the AMF set to be used to serve the UE 1501, or a list of candidate AMF(s) 1521 based on a suitable configuration and possibly by querying the NRF 1525. The selection of a set of network slice instances for the UE 1501 may be triggered by the AMF 1521 with which the UE 1501 is registered by interacting with the NSSF 1529, which may lead to a change of AMF 1521. The NSSF 1529 may interact with the AMF 1521 via an N22 reference point between AMF 1521 and NSSF 1529; and may communicate with another NSSF 1529 in a visited network via an N31 reference point (not shown by FIG. 15). Additionally, the NSSF 1529 may exhibit an Nnssf service-based interface.

As discussed previously, the CN 1520 may include an SMSF, which may be responsible for SMS subscription checking and verification, and relaying SM messages to/from the UE 1501 to/from other entities, such as an SMS-GMSC/IWMSC/SMS-router. The SMS may also interact with AMF 1521 and UDM 1527 for a notification procedure that the UE 1501 is available for SMS transfer (e.g., set a UE not reachable flag, and notifying UDM 1527 when UE 1501 is available for SMS).

The CN 120 may also include other elements that are not shown by FIG. 15, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 15). Individual NFs may share a UDSF for storing their respective unstructured data or individual NFs may each have their own UDSF located at or near the individual NFs. Additionally, the UDSF may exhibit an Nudsf service-based interface (not shown by FIG. 15). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 15 for clarity. In one example, the CN 1520 may include an Nx interface, which is an inter-CN interface between the MME (e.g., MME 1421) and the AMF 1521 in order to enable interworking between CN 1520 and CN 1420. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 16:
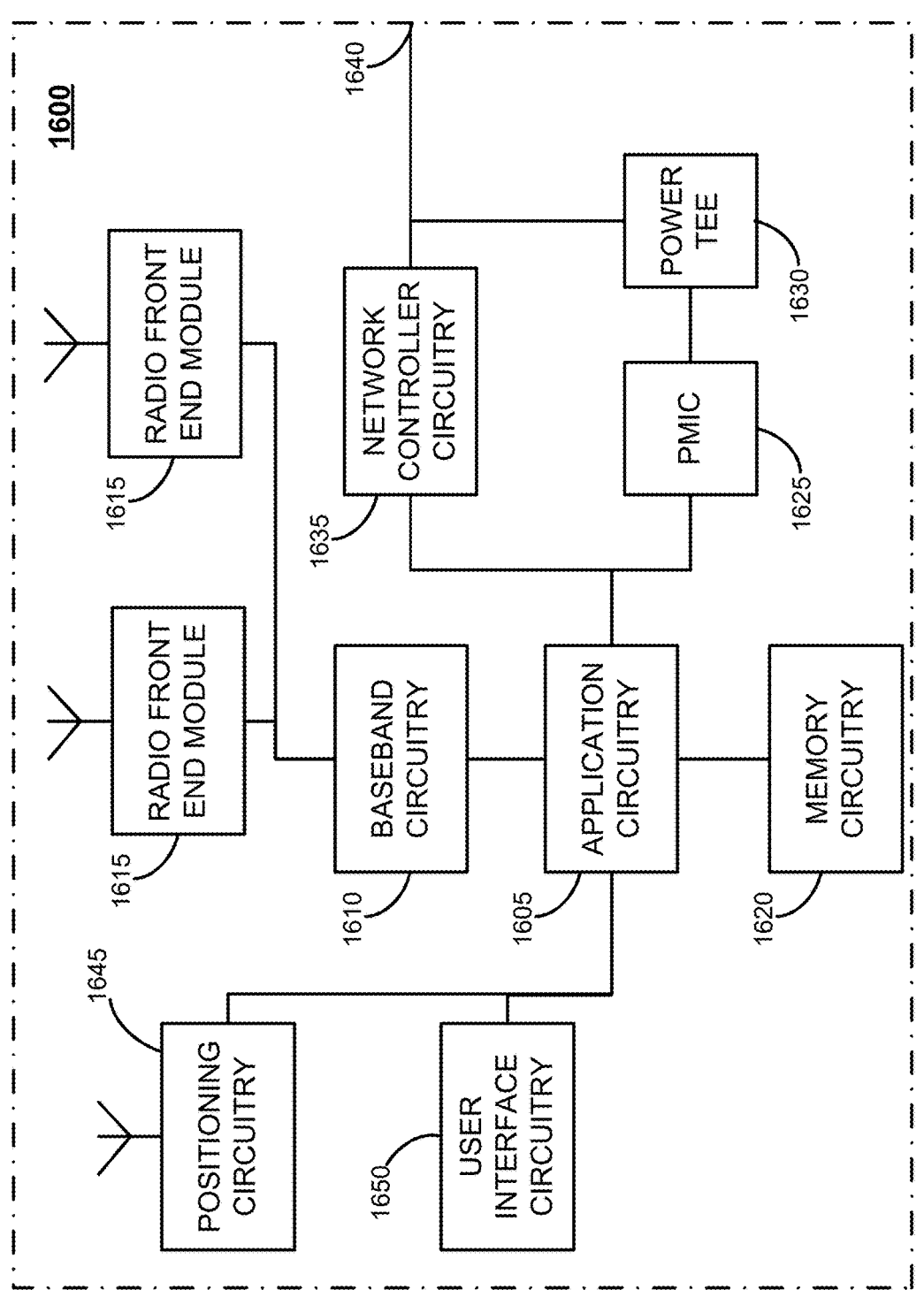
FIG. 16 illustrates an example of infrastructure equipment.

FIG. 16 illustrates an example of infrastructure equipment 1600 in accordance with various embodiments. The infrastructure equipment 1600 (or "system 1600") may be implemented as a base station, radio head, RAN node such as the RAN nodes 1311 and/or AP 1306 shown and described previously, application server(s) 1330, and/or any other element/device discussed herein. In other examples, the system 1600 could be implemented in or by a UE.

The system 1600 includes application circuitry 1605, baseband circuitry 1610, one or more radio front end modules (RFEMs) 1615, memory circuitry 1620, power management integrated circuitry (PMIC) 1625, power tee circuitry 1630, network controller circuitry 1635, network interface connector 1640, satellite positioning circuitry 1645, and user interface 1650. In some embodiments, the device 1600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1605 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1605 may be coupled with or may include memory/storage elements and may be configured to execute instructions stored in the memory/storage to enable various applications or operating systems to run on the system 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1605 may comprise, or may be, a special-purpose processor/controller to operate according to the various embodiments herein. As examples, the processor(s) of application circuitry 1605 may include one or more may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some embodiments, the system 1600 may not utilize application circuitry 1605, and instead may include a special-purpose processor/controller to process IP data received from an EPC or 5GC, for example.

In some implementations, the application circuitry 1605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1605 may comprise logic blocks or logic fabric, and other interconnected resources that may be programmed to perform various functions, such as the procedures, methods, functions, etc. Of the various embodiments discussed herein. In such embodiments, the circuitry of application circuitry 1605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 1610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1610 are discussed infra with regard to FIG. 18.

User interface circuitry 1650 may include one or more user interfaces designed to enable user interaction with the system 1600 or peripheral component interfaces designed to enable peripheral component interaction with the system 1600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1811 of FIG. 18 infra), and the RFEM may be connected to multiple antennas. In alternative implementations, both mmWave and sub-mmWave radio functions may be implemented in the same physical RFEM 1615, which incorporates both mmWave antennas and sub-mmWave.

The memory circuitry 1620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1620 may be implemented as one or more of solder down packaged integrated circuits, socketed memory modules and plug-in memory cards.

The PMIC 1625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1630 may provide for electrical power drawn from a network cable to provide both power supply and data connectivity to the infrastructure equipment 1600 using a single cable.

The network controller circuitry 1635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1600 via network interface connector 1640 using a physical connection, which may be electrical (commonly referred to as a "copper interconnect"), optical, or wireless. The network controller circuitry 1635 may include one or more dedicated processors and/or FPGAs to communicate using one or more of the aforementioned protocols. In some implementations, the network controller circuitry 1635 may include multiple controllers to provide connectivity to other networks using the same or different protocols.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the baseband circuitry 1610 and/or RFEMs 1615 to communicate with the nodes and components of the positioning network. The positioning circuitry 1645 may also provide position data and/or time data to the application circuitry 1605, which may use the data to synchronize operations with various infrastructure (e.g., RAN nodes 1311, etc.), or the like.

Figure 17:
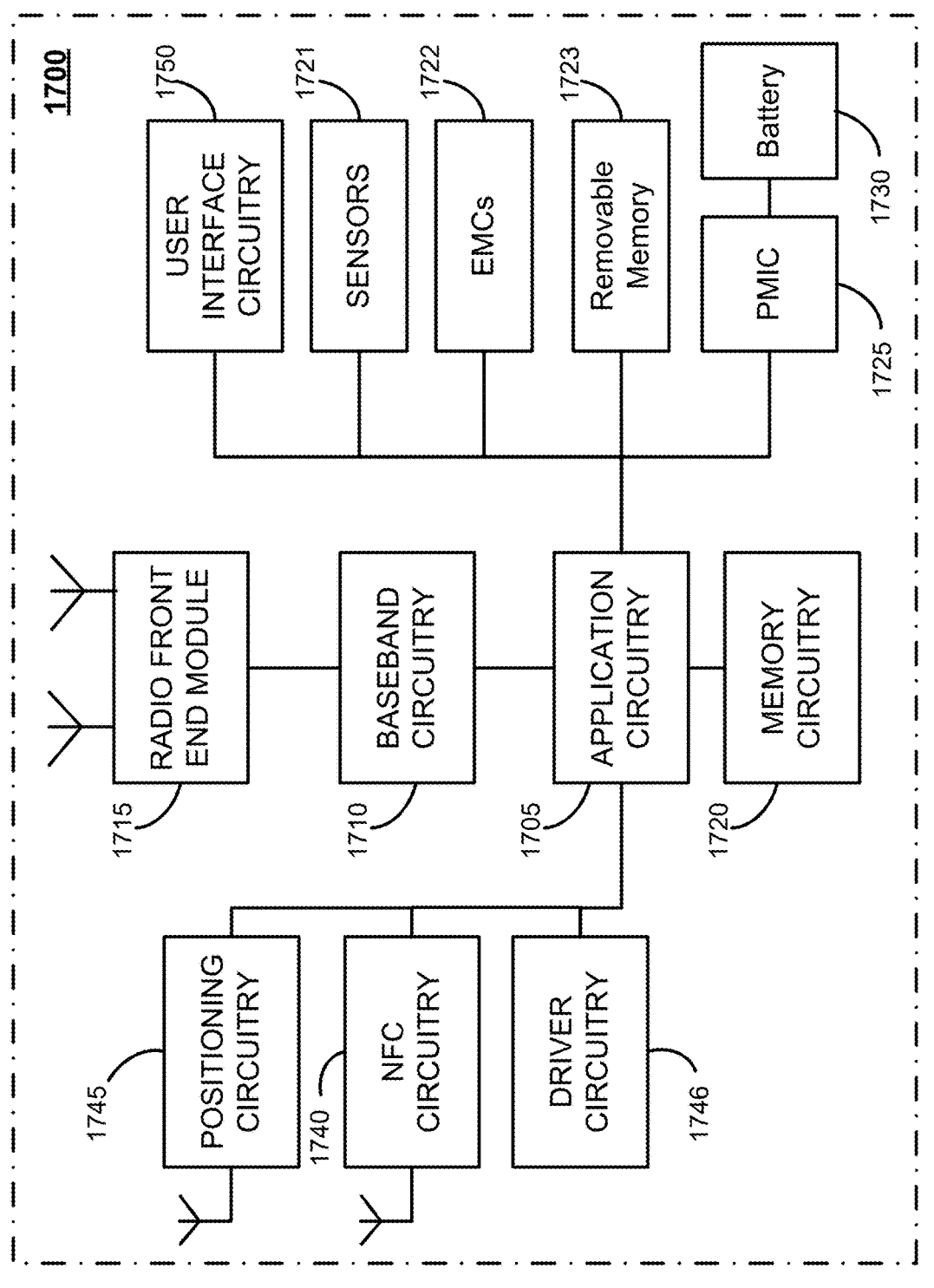
FIG. 17 illustrates an example of a platform

The components shown by FIG. 16 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

a. FIG. 17 illustrates an example of a platform 1700 (or "device 1700") in accordance with various embodiments. In embodiments, the computer platform 1700 may be suitable for use as UEs 1301, 1401, 1501, application servers 1330, and/or any other element/device discussed herein. The platform 1700 may include any combinations of the components shown in the example. The components of platform 1700 may be implemented as integrated circuits (ICs), portions thereof, discrete electronic devices, or other modules, logic, hardware, software, firmware, or a combination thereof adapted in the computer platform 1700, or as components otherwise incorporated within a chassis of a larger system. The block diagram of FIG. 17 is intended to show a high level view of components of the computer platform 1700. However, some of the components shown may be omitted, additional components may be present, and different arrangement of the components shown may occur in other implementations.

Application circuitry 1705 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1705 may be coupled with or may include memory/storage elements and may be configured to execute instructions stored in the memory/storage to enable various applications or operating systems to run on the system 1700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1605 may comprise, or may be, a special-purpose processor/controller to operate according to the various embodiments herein.

As examples, the processor(s) of application circuitry 1705 may include an Apple A-series processor. The processors of the application circuitry 1705 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.

such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1705 may be a part of a system on a chip (SoC) in which the application circuitry 1705 and other components are formed into a single integrated circuit.

Additionally or alternatively, application circuitry 1705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1705 may comprise logic blocks or logic fabric, and other interconnected resources that may be programmed to perform various functions, such as the procedures, methods, functions, etc. Of the various embodiments discussed herein. In such embodiments, the circuitry of application circuitry 1705 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. In look-up tables (LUTs) and the like.

The baseband circuitry 1710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1710 are discussed infra with regard to FIG. 18.

The RFEMs 1715 may comprise a millimeter wave (mm-Wave) RFEM and one or more sub-mmWave radio frequency integrated circuits (RFICs). In some implementations, the one or more sub-mm Wave RFICs may be physically separated from the mmWave RFEM. The RFICs may include connections to one or more antennas or antenna arrays (see e.g., antenna array 1811 of FIG. 18 infra), and the RFEM may be connected to multiple antennas. In alternative implementations, both mmWave and sub-mmWave radio functions may be implemented in the same physical RFEM 1715, which incorporates both mmWave antennas and sub-mmWave.

The memory circuitry 1720 may include any number and type of memory devices used to provide for a given amount of system memory. As examples, the memory circuitry 1720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1720 may be developed in accordance with a Joint Electron Devices Engineering Council (JEDEC) low power double data rate (LPDDR)-based design, such as LPDDR2, LPDDR3, LPDDR4, or the like. Memory circuitry 1720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1720 may be on-die memory or registers associated with the application circuitry 1705. To provide for persistent storage of information such as data, applications, operating systems and so forth, memory circuitry 1720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1700 may incorporate the three-dimensional (3D) cross-point (XPOINT) memories from Intel® and Micron®.

Removable memory circuitry 1723 may include devices, circuitry, enclosures/housings, ports or receptacles, etc. Used to couple portable data storage devices with the platform 1700. These portable data storage devices may be used for mass storage purposes, and may include, for example, flash memory cards (e.g., Secure Digital (SD) cards, microSD cards, XD picture cards, and the like), and USB flash drives, optical discs, external HDDs, and the like.

The platform 1700 may also include interface circuitry (not shown) that is used to connect external devices with the platform 1700. The external devices connected to the platform 1700 via the interface circuitry include sensor circuitry 1721 and electro-mechanical components (EMCs) 1722, as well as removable memory devices coupled to removable memory circuitry 1723.

The sensor circuitry 1721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1722 include devices, modules, or subsystems whose purpose is to enable platform 1700 to change its state, position, and/or orientation, or move or control a mechanism or (sub) system. Additionally, EMCs 1722 may be configured to generate and send messages/signaling to other components of the platform 1700 to indicate a current state of the EMCs 1722. Examples of the EMCs 1722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1700 is configured to operate one or more EMCs 1722 based on one or more captured events and/or instructions or control signals received from a service provider and/or various clients.

In some implementations, the interface circuitry may connect the platform 1700 with positioning circuitry 1745. The positioning circuitry 1745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1745 may include a Micro-PNT IC that uses a master timing clock to perform position tracking/estimation without GNSS assistance. The positioning circuitry 1745 may also be part of, or interact with, the baseband circuitry 1610 and/or RFEMs 1715 to communicate with the nodes and components of the positioning network. The positioning circuitry 1745 may also provide position data and/or time data to the application circuitry 1705, which may use the data to synchronize operations with various infrastructure (e.g., radio base stations), for turn-by-turn navigation applications, or the like In some implementations, the interface circuitry may connect the platform 1700 with Near-Field Communication (NFC) circuitry 1740. NFC circuitry 1740 is configured to provide contactless, short-range communications based on radio frequency identification (RFID) standards, wherein magnetic field induction is used to enable communication between NFC circuitry 1740 and NFC-enabled devices external to the platform 1700 (e.g., an "NFC touchpoint"). NFC circuitry 1740 comprises an NFC controller coupled with an antenna element and a processor coupled with the NFC controller. The NFC controller may be a chip/IC providing NFC functionalities to the NFC circuitry 1740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1740, or initiate data transfer between the NFC circuitry 1740 and another active NFC device (e.g., a smartphone or an NFC-enabled POS terminal) that is proximate to the platform 1700.

The driver circuitry 1746 may include software and hardware elements that operate to control particular devices that are embedded in the platform 1700, attached to the platform 1700, or otherwise communicatively coupled with the platform 1700. The driver circuitry 1746 may include individual drivers allowing other components of the platform 1700 to interact with or control various input/output (I/O) devices that may be present within, or connected to, the platform 1700. For example, driver circuitry 1746 may include a display driver to control and allow access to a display device, a touchscreen driver to control and allow access to a touchscreen interface of the platform 1700, sensor drivers to obtain sensor readings of sensor circuitry 1721 and control and allow access to sensor circuitry 1721, EMC drivers to obtain actuator positions of the EMCs 1722 and/or control and allow access to the EMCs 1722, a camera driver to control and allow access to an embedded image capture device, audio drivers to control and allow access to one or more audio devices.

The power management integrated circuitry (PMIC) 1725 (also referred to as "power management circuitry 1725") may manage power provided to various components of the platform 1700. In particular, with respect to the baseband circuitry 1710, the PMIC 1725 may control power-source selection, voltage scaling, battery charging, or DC-to-DC conversion. The PMIC 1725 may often be included when the platform 1700 is capable of being powered by a battery 1730, for example, when the device is included in a UE 1301, 1401, 1501.

In some embodiments, the PMIC 1725 may control, or otherwise be part of, various power saving mechanisms of the platform 1700. For example, if the platform 1700 is in an RRC_Connected state, where it is still connected to the RAN node as it expects to receive traffic shortly, then it may enter a state known as Discontinuous Reception Mode (DRX) after a period of inactivity. During this state, the platform 1700 may power down for brief intervals of time and thus save power. If there is no data traffic activity for an extended period of time, then the platform 1700 may transition off to an RRC_Idle state, where it disconnects from the network and does not perform operations such as channel quality feedback, handover, etc. The platform 1700 goes into a very low power state and it performs paging where again it periodically wakes up to listen to the network and then powers down again. The platform 1700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1730 may power the platform 1700, although in some examples the platform 1700 may be mounted deployed in a fixed location, and may have a power supply coupled to an electrical grid. The battery 1730 may be a lithium ion battery, a metal-air battery, such as a zinc-air battery, an aluminum-air battery, a lithium-air battery, and the like. In some implementations, such as in V2X applications, the battery 1730 may be a typical lead-acid automotive battery.

In some implementations, the battery 1730 may be a "smart battery," which includes or is coupled with a Battery Management System (BMS) or battery monitoring integrated circuitry. The BMS may be included in the platform 1700 to track the state of charge (SoCh) of the battery 1730. The BMS may be used to monitor other parameters of the battery 1730 to provide failure predictions, such as the state of health (SoH) and the state of function (SoF) of the battery 1730. The BMS may communicate the information of the battery 1730 to the application circuitry 1705 or other components of the platform 1700. The BMS may also include an analog-to-digital (ADC) convertor that allows the application circuitry 1705 to directly monitor the voltage of the battery 1730 or the current flow from the battery 1730. The battery parameters may be used to determine actions that the platform 1700 may perform, such as transmission frequency, network operation, sensing frequency, and the like.

A power block, or other power supply coupled to an electrical grid may be coupled with the BMS to charge the battery 1730. In some examples, the power block XS30 may be replaced with a wireless power receiver to obtain the power wirelessly, for example, through a loop antenna in the computer platform 1700. In these examples, a wireless battery charging circuit may be included in the BMS. The specific charging circuits chosen may depend on the size of the battery 1730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1750 includes various input/output (I/O) devices present within, or connected to, the platform 1700, and includes one or more user interfaces designed to enable user interaction with the platform 1700 and/or peripheral component interfaces designed to enable peripheral component interaction with the platform 1700. The user interface circuitry 1750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1700. The output device circuitry may also include speakers or other audio emitting devices, printer(s), and/or the like. In some embodiments, the sensor circuitry 1721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 18:
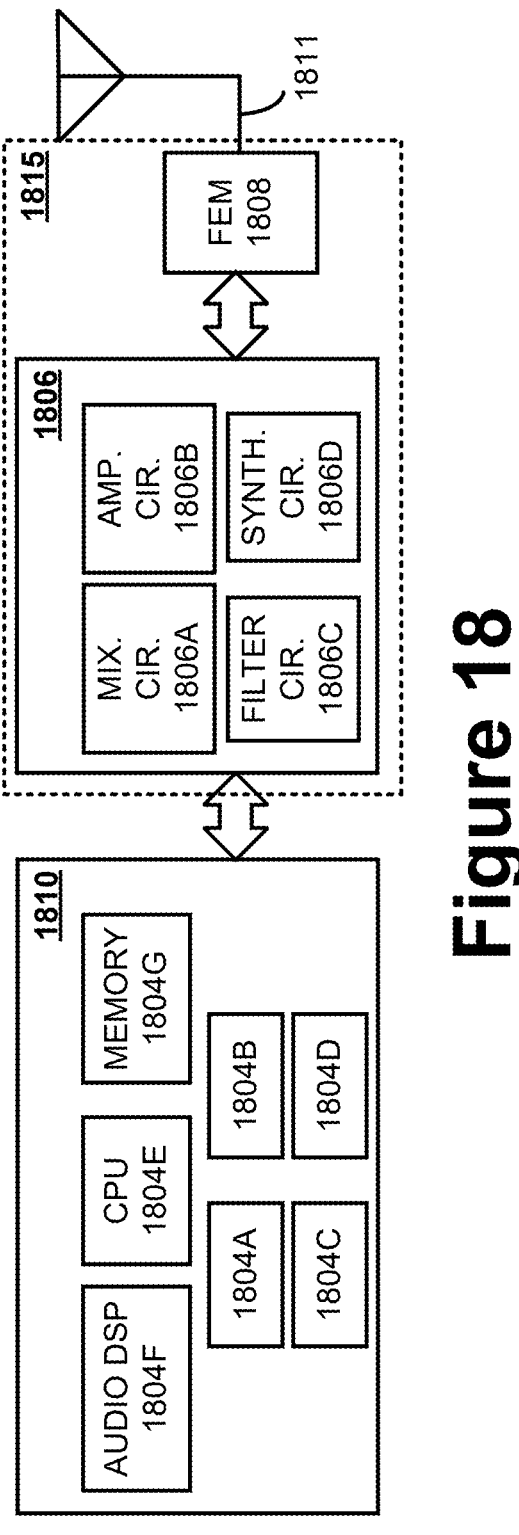
FIG. 18 illustrates example components of baseband circuitry and radio front end modules (RFEM).

FIG. 18 illustrates example components of baseband circuitry 1810 and radio front end modules (RFEM) 1815 in accordance with various embodiments. The baseband circuitry 1810 corresponds to the baseband circuitry 1610 and 1710 of FIGS. 16 and 17, respectively. The RFEM 1815 corresponds to the RFEM 1615 and 1715 of FIGS. 16 and 17, respectively. As shown, the RFEMs 1815 may include Radio Frequency (RF) circuitry 1806, front-end module (FEM) circuitry 1808, antenna array 1811 coupled together at least as shown.

The baseband circuitry 1810 includes circuitry and/or control logic configured to carry out various radio/network protocol and radio control functions that enable communication with one or more radio networks via the RF circuitry 1806. The radio control functions may include, but are not limited to, signal modulation/demodulation, encoding/decoding, radio frequency shifting, etc. In some embodiments, modulation/demodulation circuitry of the baseband circuitry 1810 may include Fast-Fourier Transform (FFT), precoding, or constellation mapping/demapping functionality. In some embodiments, encoding/decoding circuitry of the baseband circuitry 1810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1810 is configured to process baseband signals received from a receive signal path of the RF circuitry 1806 and to generate baseband signals for a transmit signal path of the RF circuitry 1806. The baseband circuitry 1810 is configured to interface with application circuitry 1605/1705 (see FIGS. 16 and 17) for generation and processing of the baseband signals and for controlling operations of the RF circuitry 1806. The baseband circuitry 1810 may handle various radio control functions.

The aforementioned circuitry and/or control logic of the baseband circuitry 1810 may include one or more single or multi-core processors. For example, the one or more processors may include a 3G baseband processor 1804A, a 4G/LTE baseband processor 1804B, a 5G/NR baseband processor 1804C, or some other baseband processor(s) 1804D for other existing generations, generations in development or to be developed in the future (e.g., sixth generation (6G), etc.). In other embodiments, some or all of the functionality of baseband processors 1804A-D may be included in modules stored in the memory 1804G and executed via a Central Processing Unit (CPU) 1804E. In other embodiments, some or all of the functionality of baseband processors 1804A-D may be provided as hardware accelerators (e.g., FPGAs, ASICs, etc.) loaded with the appropriate bit streams or logic blocks stored in respective memory cells. In various embodiments, the memory 1804G may store program code of a real-time OS (RTOS), which when executed by the CPU 1804E (or other baseband processor), is to cause the CPU 1804E (or other baseband processor) to manage resources of the baseband circuitry 1810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1810 includes one or more audio digital signal processor(s) (DSP) 1804F. The audio DSP(s) 1804F include elements for compression/decompression and echo cancellation and may include other suitable processing elements in other embodiments.

In some embodiments, each of the processors 1804A-1804E include respective memory interfaces to send/receive data to/from the memory 1804G. The baseband circuitry 1810 may further include one or more interfaces to communicatively couple to other circuitries/devices, such as an interface to send/receive data to/from memory external to the baseband circuitry 1810; an application circuitry interface to send/receive data to/from the application circuitry 1605/1705 of FIGS. 16-XT); an RF circuitry interface to send/receive data to/from RF circuitry 1806 of FIG. 18; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1725.

In alternate embodiments (which may be combined with the above described embodiments), baseband circuitry 1810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1810 may include protocol processing circuitry with one or more instances of control circuitry (not shown) to provide control functions for the digital baseband circuitry and/or radio frequency circuitry (e.g., the radio front end modules 1815).

Although not shown by FIG. 18, in some embodiments, the baseband circuitry 1810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1810 and/or RF circuitry 1806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1810 and/or RF circuitry 1806 are part of a Wi-Fi communication system. In the second example, the protocol processing circuitry would operate Wi-Fi MAC and logical link control (LLC) functions. The protocol processing circuitry may include one or more memory structures (e.g., 1804G) to store program code and data for operating the protocol functions, as well as one or more processing cores to execute the program code and perform various operations using the data. The baseband circuitry 1810 may also support radio communications for more than one wireless protocol.

The various hardware elements of the baseband circuitry 1810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1810 may be suitably combined in a single chip or chipset, or disposed on a same circuit board. In another example, some or all of the constituent components of the baseband circuitry 1810 and RF circuitry 1806 may be implemented together such as, for example, a system on a chip (SoC) or System-in-Package (SiP). In another example, some or all of the constituent components of the baseband circuitry 1810 may be implemented as a separate SoC that is communicatively coupled with and RF circuitry 1806 (or multiple instances of RF circuitry 1806). In yet another example, some or all of the constituent components of the baseband circuitry 1810 and the application circuitry 1605/1705 may be implemented together as individual SoCs mounted to a same circuit board (e.g., a "multi-chip package").

In some embodiments, the baseband circuitry 1810 may provide for communication compatible with one or more radio technologies. For example, in some embodiments, the baseband circuitry 1810 may support communication with an E-UTRAN or other WMAN, a WLAN, a WPAN. Embodiments in which the baseband circuitry 1810 is configured to support radio communications of more than one wireless protocol may be referred to as multi-mode baseband circuitry.

RF circuitry 1806 may enable communication with wireless networks using modulated electromagnetic radiation through a non-solid medium. In various embodiments, the RF circuitry 1806 may include switches, filters, amplifiers, etc. To facilitate the communication with the wireless network. RF circuitry 1806 may include a receive signal path, which may include circuitry to down-convert RF signals received from the FEM circuitry 1808 and provide baseband signals to the baseband circuitry 1810. RF circuitry 1806 may also include a transmit signal path, which may include circuitry to up-convert baseband signals provided by the baseband circuitry 1810 and provide RF output signals to the FEM circuitry 1808 for transmission.

In some embodiments, the receive signal path of the RF circuitry 1806 may include mixer circuitry 1806a, amplifier circuitry 1806b and filter circuitry 1806c. In some embodiments, the transmit signal path of the RF circuitry 1806 may include filter circuitry 1806c and mixer circuitry 1806a. RF circuitry 1806 may also include synthesizer circuitry 1806d for synthesizing a frequency for use by the mixer circuitry 1806a of the receive signal path and the transmit signal path. In some embodiments, the mixer circuitry 1806a of the receive signal path may be configured to down-convert RF signals received from the FEM circuitry 1808 based on the synthesized frequency provided by synthesizer circuitry 1806d. The amplifier circuitry 1806b may be configured to amplify the down-converted signals and the filter circuitry 1806c may be a low-pass filter (LPF) or band-pass filter (BPF) configured to remove unwanted signals from the down-converted signals to generate output baseband signals. Output baseband signals may be provided to the baseband circuitry 1810 for further processing. In some embodiments, the output baseband signals may be zero-frequency baseband signals, although this is not a requirement. In some embodiments, mixer circuitry 1806a of the receive signal path may comprise passive mixers, although the scope of the embodiments is not limited in this respect.

In some embodiments, the mixer circuitry 1806a of the transmit signal path may be configured to up-convert input baseband signals based on the synthesized frequency provided by the synthesizer circuitry 1806d to generate RF output signals for the FEM circuitry 1808. The baseband signals may be provided by the baseband circuitry 1810 and may be filtered by filter circuitry 1806c.

In some embodiments, the mixer circuitry 1806a of the receive signal path and the mixer circuitry 1806a of the transmit signal path may include two or more mixers and may be arranged for quadrature downconversion and upconversion, respectively. In some embodiments, the mixer circuitry 1806a of the receive signal path and the mixer circuitry 1806a of the transmit signal path may include two or more mixers and may be arranged for image rejection (e.g., Hartley image rejection). In some embodiments, the mixer circuitry 1806a of the receive signal path and the mixer circuitry 1806a of the transmit signal path may be arranged for direct downconversion and direct upconversion, respectively. In some embodiments, the mixer circuitry 1806a of the receive signal path and the mixer circuitry 1806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1806 may include analog-to-digital converter (ADC) and digital-to-analog converter (DAC) circuitry and the baseband circuitry 1810 may include a digital baseband interface to communicate with the RF circuitry 1806.

In some dual-mode embodiments, a separate radio IC circuitry may be provided for processing signals for each spectrum, although the scope of the embodiments is not limited in this respect.

In some embodiments, the synthesizer circuitry 1806d may be a fractional-N synthesizer or a fractional N/N+1 synthesizer, although the scope of the embodiments is not limited in this respect as other types of frequency synthesizers may be suitable. For example, synthesizer circuitry 1806d may be a delta-sigma synthesizer, a frequency multiplier, or a synthesizer comprising a phase-locked loop with a frequency divider.

The synthesizer circuitry 1806d may be configured to synthesize an output frequency for use by the mixer circuitry 1806a of the RF circuitry 1806 based on a frequency input and a divider control input. In some embodiments, the synthesizer circuitry 1806d may be a fractional N/N+1 synthesizer.

In some embodiments, frequency input may be provided by a voltage controlled oscillator (VCO), although that is not a requirement. Divider control input may be provided by either the baseband circuitry 1810 or the application circuitry 1605/1705 depending on the desired output frequency. In some embodiments, a divider control input (e.g., N) may be determined from a look-up table based on a channel indicated by the application circuitry 1605/1705.

Synthesizer circuitry 1806d of the RF circuitry 1806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1806 may include an IQ/polar converter.

FEM circuitry 1808 may include a receive signal path, which may include circuitry configured to operate on RF signals received from antenna array 1811, amplify the received signals and provide the amplified versions of the received signals to the RF circuitry 1806 for further processing. FEM circuitry 1808 may also include a transmit signal path, which may include circuitry configured to amplify signals for transmission provided by the RF circuitry 1806 for transmission by one or more of antenna elements of antenna array 1811. In various embodiments, the amplification through the transmit or receive signal paths may be done solely in the RF circuitry 1806, solely in the FEM circuitry 1808, or in both the RF circuitry 1806 and the FEM circuitry 1808.

In some embodiments, the FEM circuitry 1808 may include a TX/RX switch to switch between transmit mode and receive mode operation. The FEM circuitry 1808 may include a receive signal path and a transmit signal path. The receive signal path of the FEM circuitry 1808 may include an LNA to amplify received RF signals and provide the amplified received RF signals as an output (e.g., to the RF circuitry 1806). The transmit signal path of the FEM circuitry 1808 may include a power amplifier (PA) to amplify input RF signals (e.g., provided by RF circuitry 1806), and one or more filters to generate RF signals for subsequent transmission by one or more antenna elements of the antenna array 1811.

The antenna array 1811 comprises one or more antenna elements, each of which is configured convert electrical signals into radio waves to travel through the air and to convert received radio waves into electrical signals. For example, digital baseband signals provided by the baseband circuitry 1810 is converted into analog RF signals (e.g., modulated waveform) that will be amplified and transmitted via the antenna elements of the antenna array 1811 including one or more antenna elements (not shown). The antenna elements may be omnidirectional, direction, or a combination thereof. The antenna elements may be formed in a multitude of arranges as are known and/or discussed herein. The antenna array 1811 may comprise microstrip antennas or printed antennas that are fabricated on the surface of one or more printed circuit boards. The antenna array 1811 may be formed in as a patch of metal foil (e.g., a patch antenna) in a variety of shapes, and may be coupled with the RF circuitry 1806 and/or FEM circuitry 1808 using metal transmission lines or the like.

Processors of the application circuitry 1605/1705 and processors of the baseband circuitry 1810 may be used to execute elements of one or more instances of a protocol stack. For example, processors of the baseband circuitry 1810, alone or in combination, may be used execute Layer 3, Layer 2, or Layer 1 functionality, while processors of the application circuitry 1605/1705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 19:
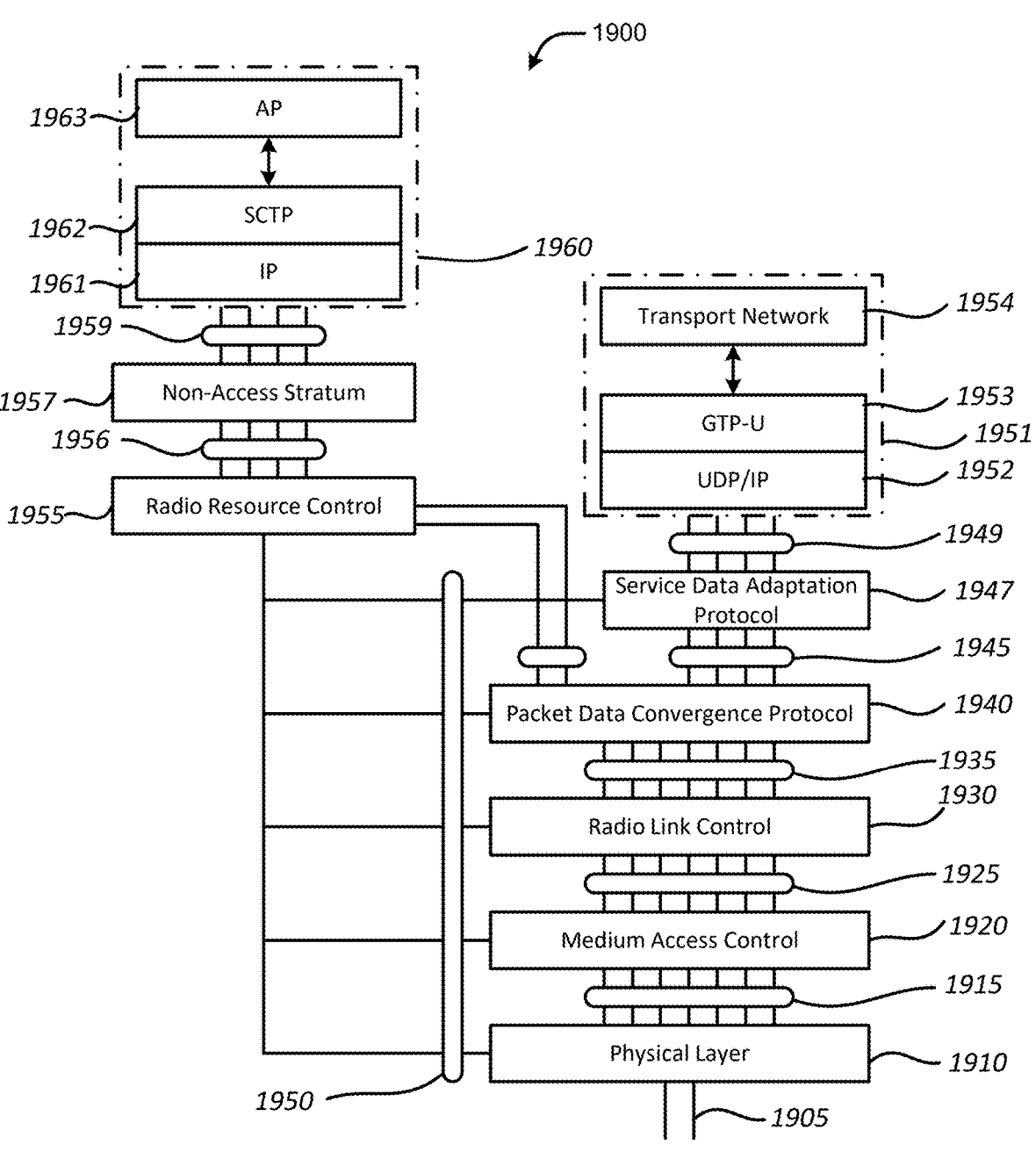
FIG. 19 illustrates various protocol functions that may be implemented in a wireless communication.

FIG. 19 illustrates various protocol functions that may be implemented in a wireless communication device according to various embodiments. In particular, FIG. 19 includes an arrangement 1900 showing interconnections between various protocol layers/entities. The following description of FIG. 19 is provided for various protocol layers/entities that operate in conjunction with the 5G/NR system standards and LTE system standards, but some or all of the aspects of FIG. 19 may be applicable to other wireless communication network systems as well.

The protocol layers of arrangement 1900 may include one or more of PHY 1910, MAC 1920, RLC 1930, PDCP 1940, SDAP 1947, RRC 1955, and NAS layer 1957, in addition to other higher layer functions not illustrated. The protocol layers may include one or more service access points (e.g., items 1959, 1956, 1950, 1949, 1945, 1935, 1925, and 1915 in FIG. 19) that may provide communication between two or more protocol layers.

The PHY 1910 may transmit and receive physical layer signals 1905 that may be received from or transmitted to one or more other communication devices. The physical layer signals 1905 may comprise one or more physical channels, such as those discussed herein. The PHY 1910 may further perform link adaptation or adaptive modulation and coding (AMC), power control, cell search (e.g., for initial synchronization and handover purposes), and other measurements used by higher layers, such as the RRC 1955. The PHY 1910 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1910 may process requests from and provide indications to an instance of MAC 1920 via one or more PHY-SAP 1915. According to some embodiments, requests and indications communicated via PHY-SAP 1915 may comprise one or more transport channels.

Instance(s) of MAC 1920 may process requests from, and provide indications to, an instance of RLC 1930 via one or more MAC-SAPs 1925. These requests and indications communicated via the MAC-SAP 1925 may comprise one or more logical channels. The MAC 1920 may perform mapping between the logical channels and transport channels, multiplexing of MAC SDUs from one or more logical channels onto TBs to be delivered to PHY 1910 via the transport channels, de-multiplexing MAC SDUs to one or more logical channels from TBs delivered from the PHY 1910 via transport channels, multiplexing MAC SDUs onto TBs, scheduling information reporting, error correction through HARQ, and logical channel prioritization.

Instance(s) of RLC 1930 may process requests from and provide indications to an instance of PDCP 1940 via one or more radio link control service access points (RLC-SAP) 1935. These requests and indications communicated via RLC-SAP 1935 may comprise one or more RLC channels. The RLC 1930 may operate in a plurality of modes of operation, including: Transparent Mode (TM), Unacknowledged Mode (UM), and Acknowledged Mode (AM). The RLC 1930 may execute transfer of upper layer protocol data units (PDUs), error correction through automatic repeat request (ARQ) for AM data transfers, and concatenation, segmentation and reassembly of RLC SDUs for UM and AM data transfers. The RLC 1930 may also execute resegmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1940 may process requests from and provide indications to instance(s) of RRC 1955 and/or instance(s) of SDAP 1947 via one or more packet data convergence protocol service access points (PDCP-SAP) 1945. These requests and indications communicated via PDCP-SAP 1945 may comprise one or more radio bearers. The PDCP 1940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1947 may process requests from and provide indications to one or more higher layer protocol entities via one or more SDAP-SAP 1949. These requests and indications communicated via SDAP-SAP 1949 may comprise one or more QoS flows. The SDAP 1947 may map QoS flows to DRBs, and vice versa, and may also mark QFIs in DL and UL packets. A single SDAP entity 1947 may be configured for an individual PDU session. In the UL direction, the NG-RAN 1310 may control the mapping of QoS Flows to DRB(s) in two different ways, reflective mapping or explicit mapping. For reflective mapping, the SDAP 1947 of a UE 1301 may monitor the QFIs of the DL packets for each DRB, and may apply the same mapping for packets flowing in the UL direction. For a DRB, the SDAP 1947 of the UE 1301 may map the UL packets belonging to the QoS flows(s) corresponding to the QoS flow ID(s) and PDU session observed in the DL packets for that DRB. To enable reflective mapping, the NG-RAN 1510 may mark DL packets over the Uu interface with a QoS flow ID. The explicit mapping may involve the RRC 1955 configuring the SDAP 1947 with an explicit QoS flow to DRB mapping rule, which may be stored and followed by the SDAP 1947. In embodiments, the SDAP 1947 may only be used in NR implementations and may not be used in LTE implementations.

The RRC 1955 may configure, via one or more management service access points (M-SAP), aspects of one or more protocol layers, which may include one or more instances of PHY 1910, MAC 1920, RLC 1930, PDCP 1940 and SDAP 1947. In embodiments, an instance of RRC 1955 may process requests from and provide indications to one or more NAS entities 1957 via one or more RRC-SAPs 1956. The main services and functions of the RRC 1955 may include broadcast of system information (e.g., included in MIBs or SIBs related to the NAS), broadcast of system information related to the access stratum (AS), paging, establishment, maintenance and release of an RRC connection between the UE 1301 and RAN 1310 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1957 may form the highest stratum of the control plane between the UE 1301 and the AMF 1521. The NAS 1957 may support the mobility of the UEs 1301 and the session management procedures to establish and maintain IP connectivity between the UE 1301 and a P-GW in LTE systems.

According to various embodiments, one or more protocol entities of arrangement 1900 may be implemented in UEs 1301, RAN nodes 1311, AMF 1521 in NR implementations or MME 1421 in LTE implementations, UPF 1502 in NR implementations or S-GW 1422 and P-GW 1423 in LTE implementations, or the like to be used for control plane or user plane communications protocol stack between the aforementioned devices. In such embodiments, one or more protocol entities that may be implemented in one or more of UE 1301, gNB 1311, AMF 1521, etc. May communicate with a respective peer protocol entity that may be implemented in or on another device using the services of respective lower layer protocol entities to perform such communication. In some embodiments, a gNB-CU of the gNB 1311 may host the RRC 1955, SDAP 1947, and PDCP 1940 of the gNB that controls the operation of one or more gNB-DUs, and the gNB-DUs of the gNB 1311 may each host the RLC 1930, MAC 1920, and PHY 1910 of the gNB 1311.

In a first example, a control plane protocol stack may comprise, in order from highest layer to lowest layer, NAS 1957, RRC 1955, PDCP 1940, RLC 1930, MAC 1920, and PHY 1910. In this example, upper layers 1960 may be built on top of the NAS 1957, which includes an IP layer 1961, an SCTP 1962, and an application layer signaling protocol (AP) 1963.

In NR implementations, the AP 1963 may be an NG application protocol layer (NGAP or NG-AP) 1963 for the NG interface 1313 defined between the NG-RAN node 1311 and the AMF 1521, or the AP 1963 may be an Xn application protocol layer (XnAP or Xn-AP) 1963 for the Xn interface 1312 that is defined between two or more RAN nodes 1311.

The NG-AP 1963 may support the functions of the NG interface 1313 and may comprise Elementary Procedures (EPS). An NG-AP EP may be a unit of interaction between the NG-RAN node 1311 and the AMF 1521. The NG-AP 1963 services may comprise two groups: UE-associated services (e.g., services related to a UE 1301) and non-UE-associated services (e.g., services related to the whole NG interface instance between the NG-RAN node 1311 and AMF 1521). These services may include functions including, but not limited to: a paging function for the sending of paging requests to NG-RAN nodes 1311 involved in a particular paging area; a UE context management function for allowing the AMF 1521 to establish, modify, and/or release a UE context in the AMF 1521 and the NG-RAN node 1311; a mobility function for UEs 1301 in ECM-CONNECTED mode for intra-system HOs to support mobility within NG-RAN and inter-system HOs to support mobility from/to EPS systems; a NAS Signaling Transport function for transporting or rerouting NAS messages between UE 1301 and AMF 1521; a NAS node selection function for determining an association between the AMF 1521 and the UE 1301; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1311 via CN 1320; and/or other like functions.

The XnAP 1963 may support the functions of the Xn interface 1312 and may comprise XnAP basic mobility procedures and XnAP global procedures. The XnAP basic mobility procedures may comprise procedures used to handle UE mobility within the NG RAN 1311 (or E-UTRAN 1410), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1301, such as Xn interface setup and reset procedures, NG-RAN update procedures, cell activation procedures, and the like.

In LTE implementations, the AP 1963 may be an S1 Application Protocol layer (S1-AP) 1963 for the S1 interface 1313 defined between an E-UTRAN node 1311 and an MME, or the AP 1963 may be an X2 application protocol layer (X2AP or X2-AP) 1963 for the X2 interface 1312 that is defined between two or more E-UTRAN nodes 1311.

The S1 Application Protocol layer (S1-AP) 1963 may support the functions of the S1 interface, and similar to the NG-AP discussed previously, the S1-AP may comprise S1-AP EPs. An S1-AP EP may be a unit of interaction between the E-UTRAN node 1311 and an MME 1421 within an LTE CN 1320. The S1-AP 1963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1963 may support the functions of the X2 interface 1312 and may comprise X2AP basic mobility procedures and X2AP global procedures. The X2AP basic mobility procedures may comprise procedures used to handle UE mobility within the E-UTRAN 1320, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1301, such as X2 interface setup and reset procedures, load indication procedures, error indication procedures, cell activation procedures, and the like.

The SCTP layer (alternatively referred to as the SCTP/IP layer) 1962 may provide guaranteed delivery of application layer messages (e.g., NGAP or XnAP messages in NR implementations, or S1-AP or X2AP messages in LTE implementations). The SCTP 1962 may ensure reliable delivery of signaling messages between the RAN node 1311 and the AMF 1521/MME 1421 based, in part, on the IP protocol, supported by the IP 1961. The Internet Protocol layer (IP) 1961 may be used to perform packet addressing and routing functionality. In some implementations the IP layer 1961 may use point-to-point transmission to deliver and convey PDUs. In this regard, the RAN node 1311 may comprise L2 and L1 layer communication links (e.g., wired or wireless) with the MME/AMF to exchange information.

In a second example, a user plane protocol stack may comprise, in order from highest layer to lowest layer, SDAP 1947, PDCP 1940, RLC 1930, MAC 1920, and PHY 1910. The user plane protocol stack may be used for communication between the UE 1301, the RAN node 1311, and UPF 1502 in NR implementations or an S-GW 1422 and P-GW

1423 in LTE implementations. In this example, upper layers 1951 may be built on top of the SDAP 1947, and may include a user datagram protocol (UDP) and IP security layer (UDP/IP) 1952, a General Packet Radio Service (GPRS) Tunneling Protocol for the user plane layer (GTP-U) 1953, and a User Plane PDU layer (UP PDU) 1963.

The transport network layer 1954 (also referred to as a "transport layer") may be built on IP transport, and the GTP-U 1953 may be used on top of the UDP/IP layer 1952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1953 may be used for carrying user data within the GPRS core network and between the radio access network and the core network. The user data transported can be packets in any of IPv4, IPv6, or PPP formats, for example. The UDP/IP 1952 may provide checksums for data integrity, port numbers for addressing different functions at the source and destination, and encryption and authentication on the selected data flows. The RAN node 1311 and the S-GW 1422 may utilize an S1-U interface to exchange user plane data via a protocol stack comprising an L1 layer (e.g., PHY 1910), an L2 layer (e.g., MAC 1920, RLC 1930, PDCP 1940, and/or SDAP 1947), the UDP/IP layer 1952, and the GTP-U 1953. The S-GW 1422 and the P-GW 1423 may utilize an S5/S8a interface to exchange user plane data via a protocol stack comprising an L1 layer, an L2 layer, the UDP/IP layer 1952, and the GTP-U 1953. As discussed previously, NAS protocols may support the mobility of the UE 1301 and the session management procedures to establish and maintain IP connectivity between the UE 1301 and the P-GW 1423.

Moreover, although not shown by FIG. 19, an application layer may be present above the AP 1963 and/or the transport network layer 1954. The application layer may be a layer in which a user of the UE 1301, RAN node 1311, or other network element interacts with software applications being executed, for example, by application circuitry 1605 or application circuitry 1705, respectively. The application layer may also provide one or more interfaces for software applications to interact with communications systems of the UE 1301 or RAN node 1311, such as the baseband circuitry 1810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 20:
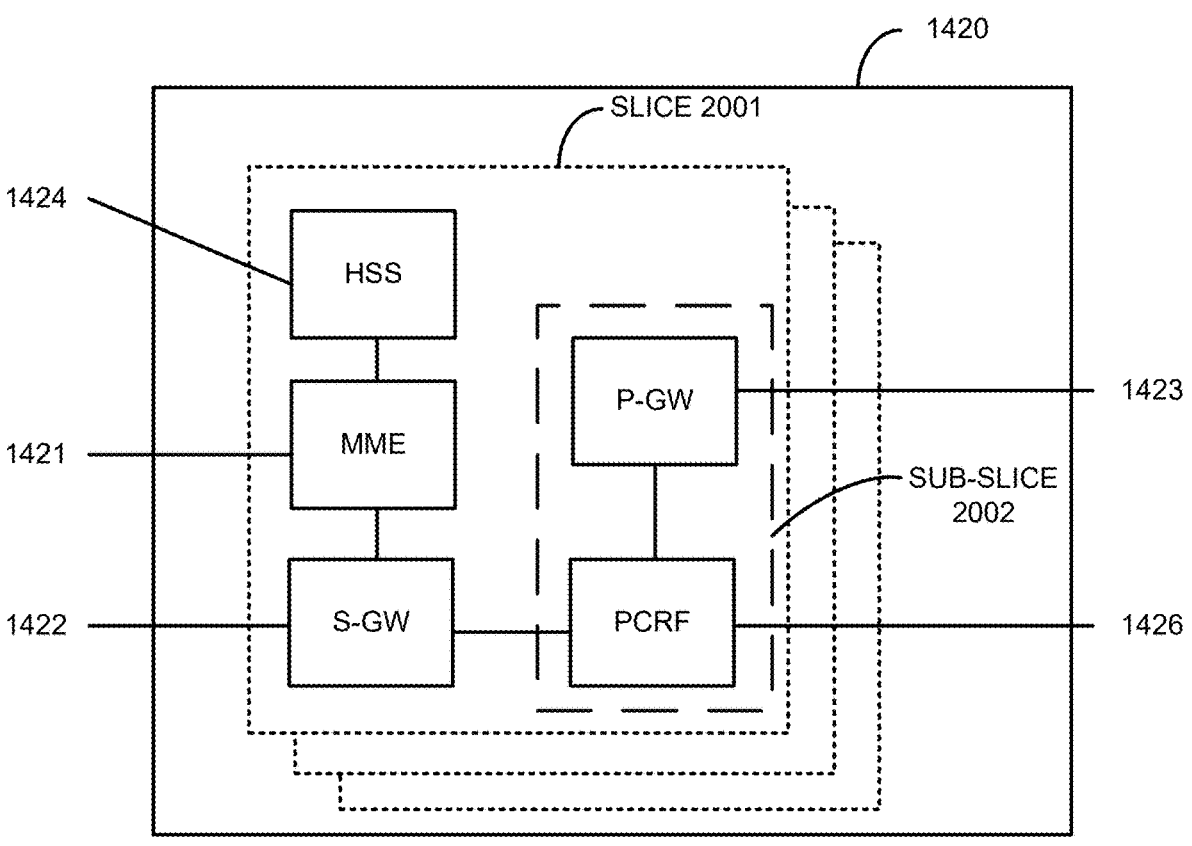
FIG. 20 illustrates components of a core network.

FIG. 20 illustrates components of a core network in accordance with various embodiments. The components of the CN 1420 may be implemented in one physical node or separate physical nodes including components to read and execute instructions from a machine-readable or computer-readable medium (e.g., a non-transitory machine-readable storage medium). In embodiments, the components of CN 1520 may be implemented in a same or similar manner as discussed herein with regard to the components of CN 1420. In some embodiments, NFV is utilized to virtualize any or all of the above-described network node functions via executable instructions stored in one or more computer-readable storage mediums (described in further detail below). A logical instantiation of the CN 1420 may be referred to as a network slice 2001, and individual logical instantiations of the CN 1420 may provide specific network capabilities and network characteristics. A logical instantiation of a portion of the CN 1420 may be referred to as a network sub-slice 2002 (e.g., the network sub-slice 2002 is shown to include the P-GW 1423 and the PCRF 1426).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 15), a network slice always comprises a RAN part and a CN part. The support of network slicing relies on the principle that traffic for different slices is handled by different PDU sessions. The network can realize the different network slices by scheduling and also by providing different L1/L2 configurations. The UE 1501 provides assistance information for network slice selection in an appropriate RRC message, if it has been provided by NAS. While the network can support large number of slices, the UE need not support more than 8 slices simultaneously.

A network slice may include the CN 1520 control plane and user plane NFs, NG-RANs 1510 in a serving PLMN, and a N3IWF functions in the serving PLMN. Individual network slices may have different S-NSSAI and/or may have different SSTs. NSSAI includes one or more S-NS-SAIs, and each network slice is uniquely identified by an S-NSSAI. Network slices may differ for supported features and network functions optimizations, and/or multiple network slice instances may deliver the same service/features but for different groups of UEs 1501 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 1521 instance serving an individual UE 1501 may belong to each of the network slice instances serving that UE.

Network Slicing in the NG-RAN 1510 involves RAN slice awareness. RAN slice awareness includes differentiated handling of traffic for different network slices, which have been pre-configured. Slice awareness in the NG-RAN 1510 is introduced at the PDU session level by indicating the S-NSSAI corresponding to a PDU session in all signaling that includes PDU session resource information. How the NG-RAN 1510 supports the slice enabling in terms of NG-RAN functions (e.g., the set of network functions that comprise each slice) is implementation dependent. The NG-RAN 1510 selects the RAN part of the network slice using assistance information provided by the UE 1501 or the 5GC 1520, which unambiguously identifies one or more of the pre-configured network slices in the PLMN. The NG-RAN 1510 also supports resource management and policy enforcement between slices as per SLAs. A single NG-RAN node may support multiple slices, and the NG-RAN 1510 may also apply an appropriate RRM policy for the SLA in place to each supported slice. The NG-RAN 1510 may also support QoS differentiation within a slice.

The NG-RAN 1510 may also use the UE assistance information for the selection of an AMF 1521 during an initial attach, if available. The NG-RAN 1510 uses the assistance information for routing the initial NAS to an AMF 1521. If the NG-RAN 1510 is unable to select an AMF 1521 using the assistance information, or the UE 1501 does not provide any such information, the NG-RAN 1510 sends the NAS signaling to a default AMF 1521, which may be among a pool of AMFs 1521. For subsequent accesses, the UE 1501 provides a temp ID, which is assigned to the UE 1501 by the 5GC 1520, to enable the NG-RAN 1510 to route the NAS message to the appropriate AMF 1521 as long as the temp ID is valid. The NG-RAN 1510 is aware of, and can reach, the AMF 1521 that is associated with the temp ID. Otherwise, the method for initial attach applies.

The NG-RAN 1510 supports resource isolation between slices. NG-RAN 1510 resource isolation may be achieved by means of RRM policies and protection mechanisms that should avoid that shortage of shared resources if one slice breaks the service level agreement for another slice. In some implementations, it is possible to fully dedicate NG-RAN 1510 resources to a certain slice. How NG-RAN 1510 supports resource isolation is implementation dependent.

Some slices may be available only in part of the network. Awareness in the NG-RAN 1510 of the slices supported in the cells of its neighbors may be beneficial for inter-frequency mobility in connected mode. The slice availability may not change within the UE's registration area. The NG-RAN 1510 and the 5GC 1520 are responsible to handle a service request for a slice that may or may not be available in a given area. Admission or rejection of access to a slice may depend on factors such as support for the slice, availability of resources, support of the requested service by NG-RAN 1510.

The UE 1501 may be associated with multiple network slices simultaneously. In case the UE 1501 is associated with multiple slices simultaneously, only one signaling connection is maintained, and for intra-frequency cell reselection, the UE 1501 tries to camp on the best cell. For inter-frequency cell reselection, dedicated priorities can be used to control the frequency on which the UE 1501 camps. The 5GC 1520 is to validate that the UE 1501 has the rights to access a network slice. Prior to receiving an Initial Context Setup Request message, the NG-RAN 1510 may be allowed to apply some provisional/local policies, based on awareness of a particular slice that the UE 1501 is requesting to access. During the initial context setup, the NG-RAN 1510 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 21:
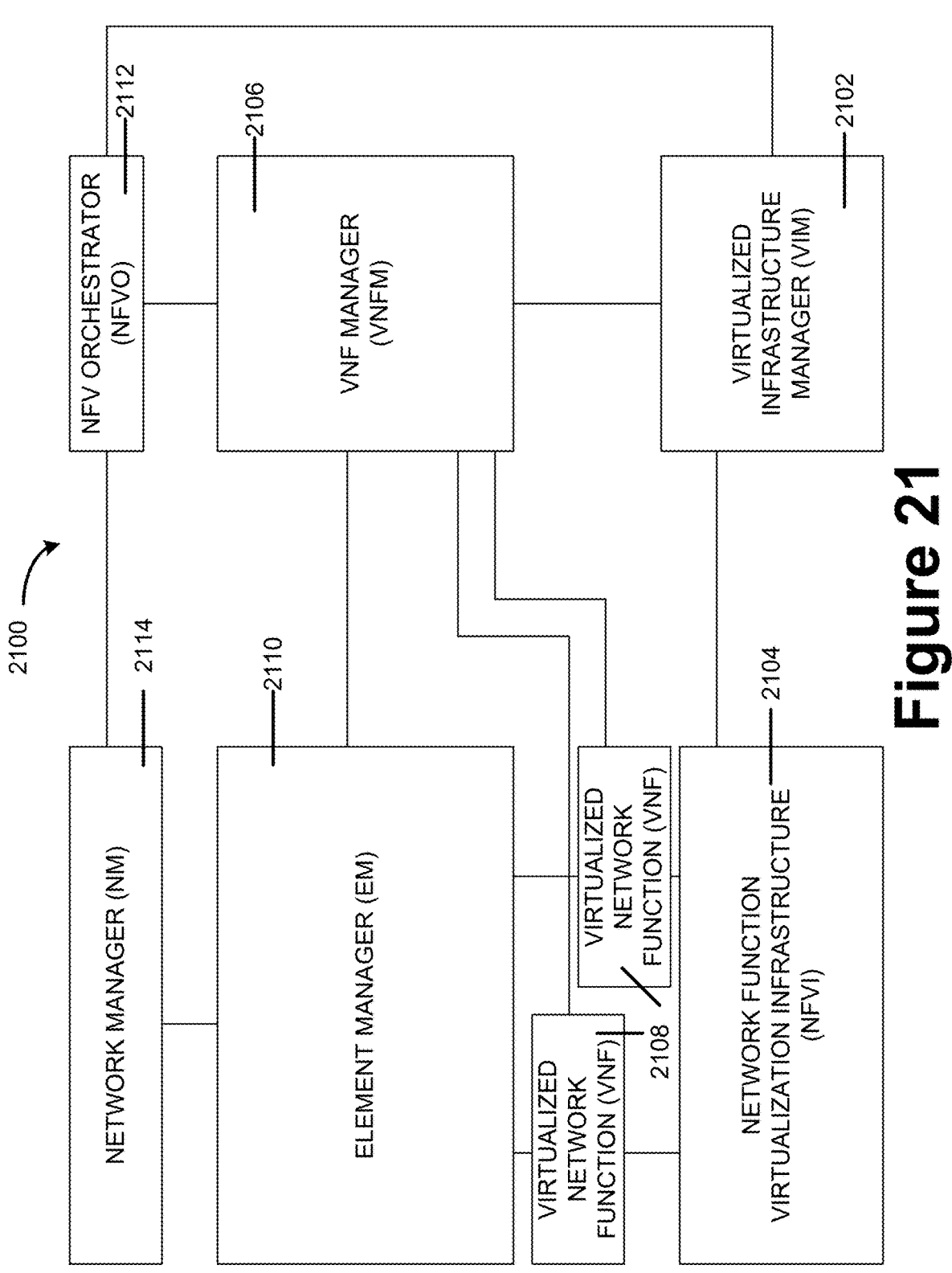
FIG. 21 is a block diagram illustrating components of a system 1400 to support NFV.

FIG. 21 is a block diagram illustrating components, according to some example embodiments, of a system 2100 to support NFV. The system 2100 is illustrated as including a VIM 2102, an NFVI 2104, an VNFM 2106, VNFs 2108, an EM 2110, an NFVO 2112, and a NM 2114.

The VIM 2102 manages the resources of the NFVI 2104. The NFVI 2104 can include physical or virtual resources and applications (including hypervisors) used to execute the system 2100. The VIM 2102 may manage the life cycle of virtual resources with the NFVI 2104 (e.g., creation, maintenance, and tear down of VMs associated with one or more physical resources), track VM instances, track performance, fault and security of VM instances and associated physical resources, and expose VM instances and associated physical resources to other management systems.

The VNFM 2106 may manage the VNFs 2108. The VNFs 2108 may be used to execute EPC components/functions. The VNFM 2106 may manage the life cycle of the VNFs 2108 and track performance, fault and security of the virtual aspects of VNFs 2108. The EM 2110 may track the performance, fault and security of the functional aspects of VNFs 2108. The tracking data from the VNFM 2106 and the EM 2110 may comprise, for example, PM data used by the VIM 2102 or the NFVI 2104. Both the VNFM 2106 and the EM 2110 can scale up/down the quantity of VNFs of the system 2100.

The NFVO 2112 may coordinate, authorize, release and engage resources of the NFVI 2104 in order to provide the requested service (e.g., to execute an EPC function, component, or slice). The NM 2114 may provide a package of end-user functions with the responsibility for the management of a network, which may include network elements with VNFs, non-virtualized network functions, or both (management of the VNFs may occur via the EM 2110).

Figure 22:
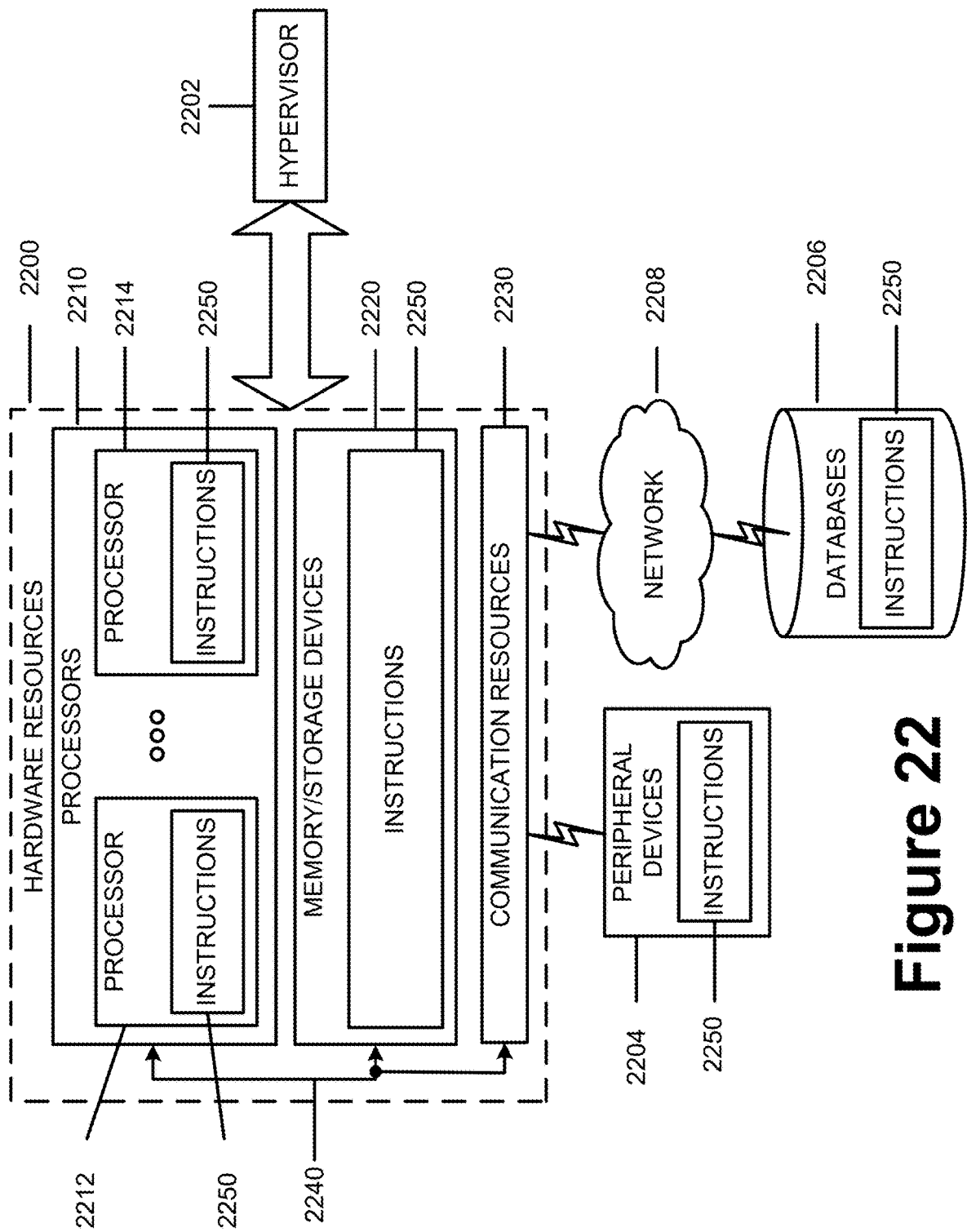
FIG. 22 is a block diagram illustrating components, according to some example embodiments, able to read instructions from a machine-readable or computer-readable medium (e.g., a non-transitory machine-readable storage medium) and perform any one or more of the methodologies discussed herein.

FIG. 22 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 22 shows a diagrammatic representation of hardware resources 2200 including one or more processors (or processor cores) 2210, one or more memory/storage devices 2220, and one or more communication resources 2230, each of which may be communicatively coupled via a bus 2240. For embodiments where node virtualization (e.g., NFV) is utilized, a hypervisor 2202 may be executed to provide an execution environment for one or more network slices/sub-slices to utilize the hardware resources 2200.

The processors 2210 may include, for example, a processor 2212 and a processor 2214. The processor(s) 2210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2220 may include main memory, disk storage, or any suitable combination thereof. The memory/storage devices 2220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2230 may include interconnection or network interface components or other suitable devices to communicate with one or more peripheral devices 2204 or one or more databases 2206 via a network 2208. For example, the communication resources 2230 may include wired communication components (e.g., for coupling via USB), cellular communication components, NFC components, Bluetooth® (or Bluetooth® Low Energy) components, Wi-Fi® components, and other communication components.

Instructions 2250 may comprise software, a program, an application, an applet, an app, or other executable code for causing at least any of the processors 2210 to perform any one or more of the methodologies discussed herein. The instructions 2250 may reside, completely or partially, within at least one of the processors 2210 (e.g., within the processor's cache memory), the memory/storage devices 2220, or any suitable combination thereof. Furthermore, any portion of the instructions 2250 may be transferred to the hardware resources 2200 from any combination of the peripheral devices 2204 or the databases 2206. Accordingly, the memory of processors 2210, the memory/storage devices 2220, the peripheral devices 2204, and the databases 2206 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method for muting resource elements used for wireless communications, the method comprising:
   obtaining configuration data that indicates a frequency density of muted resource blocks (RBs) in a frequency domain, the frequency density of muted RBs in the frequency domain representing a ratio of a) a number of the muted RBs repeated at regular intervals in the frequency domain for a physical uplink shared channel (PUSCH) transmission to b) a number of RBs to be allocated for the PUSCH transmission;
   identifying, based on a value of an antenna ports information element in downlink control information (DCI) that schedules the PUSCH transmission, a group of resource elements within the muted RBs;
   determining, based on the frequency density of the muted RBs in the frequency domain and the identified group of resource elements, a muted resource pattern (MRP) within the RBs for the scheduled PUSCH transmission; and
   causing a transmission of an allocation of RBs for the PUSCH transmission without transmission on the identified group of resource elements of the determined MRP.

2. The method of claim 1, wherein the frequency density of muted RBs has been provided using high layer signaling.

3. The method of claim 2, the high layer signaling includes SIB1 or RRC signaling.

4. The method of claim 1, wherein identifying, by the UE and based on a value of an antenna ports information element in the downlink control information (DCI) that schedules the PUSCH transmission, a group of resource elements within the muted RBs comprises:
   determining, by the UE and based on the value of the antenna ports information element in the DCI that schedules the PUSCH transmission, that at least one DMRS CDM group is not included in a 'Number of DMRS CDM group(s) without data' field; and
   based on a determination, by the UE, that at least one DMRS CDM Group is not included in a 'Number of DMRS CDM group(s) without data' field, selecting an MRP pattern to include a group of resource elements of a DMRS CDM group with a lowest index among the DMRS CDM groups that is not included in 'Number of DMRS CDM group(s) without data'.

5. The method of claim 4, wherein the DMRS CDM groups include Cat-1 DMRS CDM group or Cat-2 DMRS CDM group.

6. The method of claim 1, wherein identifying, by the UE and based on a value of an antenna ports information element in the downlink control information (DCI) that schedules the PUSCH transmission, a group of resource elements within the muted RBs comprises:

determining, by the UE and based on the value of the antenna ports information element, that each of a plurality of DMRS CDM groups are included in a 'Number of DMRS CDM group(s) without data' field; and based on a determination, by the UE, that each of a plurality of DMRS CDM groups are included in a 'Number of DMRS CDM group(s) without data' field, generating a predetermined muted resource pattern (MRP) that includes muted resource elements that do not overlap with resource elements of Cat-1 DMRS CDM group or Cat-2 DMRS CDM group.

7. The method of claim 6, wherein the predetermined muted resource pattern (MRP) is hard-encoded in specification or generated based on parameters that is configured by RRC signaling.

8. The method of claim 7, wherein the parameters configured by RRC signaling for the MRP determination further comprises:

a set of MRP patterns is first hard-encoded in specification in terms of REs in the frequency domain and a time domain and each MRP pattern is associated with a unique pattern index; and a pattern index value is given by higher layers to select one of the hard-encoded MRP patterns for a given PUSCH transmission.

9. The method of claim 8, wherein the parameters configured by RRC signaling for the MRP determination include at least:

a first parameter that indicates number of resource elements (RE) in the frequency domain, a second parameter that indicates number of REs in the time domain, and a third parameter that indicates a starting symbol of the MRP.

10. The method of claim 9, wherein the indicated number of REs is consecutive or non-consecutive.

11. One or more processors for muting resource elements used for wireless communications and configured to, when executing instructions stored in a memory, perform operations comprising:

obtaining, by the one or more processors, configuration data that indicates a frequency density of muted resource blocks (RBs) in a frequency domain, the frequency density of muted RBs in the frequency domain representing a ratio of a) a number of the muted RBs repeated at regular intervals in the frequency domain for a physical uplink shared channel (PUSCH) transmission to b) a number of RBs to be allocated for the PUSCH transmission;

identifying, by the one or more processors and based on a value of an antenna ports information element in downlink control information (DCI) that schedules the PUSCH transmission, a group of resource elements within the muted RBs;

determining, by the one or more processors and based on the frequency density of the muted RBs in the frequency domain and the identified group of resource elements, a muted resource pattern (MRP) within-resource blocks the RBs of the scheduled PUSCH transmission; and causing, by the one or more processors, a transmission of the RBs of the scheduled PUSCH transmission without transmission on the identified group of resource elements of the determined MRP.

12. The one or more processors of claim 11, wherein the frequency density of muted RBs has been provided using high layer signaling.

13. The one or more processors of claim 12, the high layer signaling includes SIB1 or RRC signaling.

14. The one or more processors of claim 11, wherein identifying, by the one or more processors and based on a value of an antenna ports information element in downlink control information (DCI) that schedules the PUSCH transmission, a group of resource elements within the muted RBs comprises:

determining, by the one or more processors and based on the value of the antenna ports information element in the DCI that schedules the PUSCH transmission, that at least one DMRS CDM group is not included in a 'Number of DMRS CDM group(s) without data' field; and based on a determination, by the one or more processors, that at least one DMRS CDM Group is not included in a 'Number of DMRS CDM group(s) without data' field, selecting an MRP pattern to include a group of resource elements of a DMRS CDM group with a lowest index among the DMRS CDM groups that is not included in 'Number of DMRS CDM group(s) without data'.

15. The one or more processors of claim 14, wherein the DMRS CDM groups include Cat-1 DMRS CDM group or Cat-2 DMRS CDM group.

16. The one or more processors of claim 11, wherein identifying, by the one or more processors and based on a value of an antenna ports information element in the downlink control information (DCI) that schedules the PUSCH transmission, a group of resource elements within the muted RBs comprises:

determining, by the one or more processors and based on the value of the antenna ports information element, that each of a plurality of DMRS CDM groups are included in a 'Number of DMRS CDM group(s) without data' field; and based on a determination, by the one or more processors, that each of a plurality of DMRS CDM groups are included in a 'Number of DMRS CDM group(s) without data' field, generating a predetermined muted resource pattern (MRP) that includes muted resource elements that do not overlap with resource elements of Cat-1 DMRS CDM group or Cat-2 DMRS CDM group.

17. The one or more processors of claim 16, wherein the predetermined muted resource pattern (MRP) is hard-encoded in specification or generated based on parameters that is configured by RRC signaling.

18. The one or more processors of claim 17, wherein the parameters configured by RRC signaling for the MRP determination further comprises:

a set of MRP patterns is first hard-encoded in specification in terms of REs in the frequency domain and a time domain and each MRP pattern is associated with a unique pattern index; and

51 a pattern index value is given by higher layers to select one of the hard-encoded MRP patterns for a given PUSCH transmission.

19. The one or more processors of claim 18, wherein the parameters configured by RRC signaling for the MRP determination include at least:

a first parameter that indicates a number of resource elements (RE) in the frequency domain, a second parameter that indicates a number of REs in the time domain, and a third parameter that indicates a starting symbol of the MRP.

20. One or more non-transitory computer-readable media storing instructions that, when executed by one or more computers, cause the one or more computers to perform operations for muting resource elements used for wireless communications, the operations comprising:

obtaining configuration data that indicates a frequency density of muted resource blocks (RBs) in a frequency domain, the frequency density of muted RBs in the frequency domain representing a ratio of a) a number of the muted RBs repeated at regular intervals in the frequency domain for a physical uplink shared channel (PUSCH) transmission to b) a number of RBs to be allocated for the PUSCH transmission;

identifying, based on a value of an antenna ports information element in downlink control information (DCI) that schedules the PUSCH transmission, a group of resource elements within the muted RBs;

determining, based on the frequency density of the muted RBs in the frequency domain and the identified group of resource elements, a muted resource pattern (MRP) within the RBs of the scheduled PUSCH transmission; and causing a transmission of the RBs of the scheduled PUSCH transmission without transmission on the identified group of resource elements of the determined MRP.

* * * * *